US011859042B2

(12) United States Patent
Poppenberg et al.

(10) Patent No.: US 11,859,042 B2
(45) Date of Patent: Jan. 2, 2024

(54) METHOD FOR PREPARING A THERMOPLASTIC POLYURETHANE HAVING A LOW GLASS TRANSITION TEMPERATURE

(71) Applicant: BASF SE, Ludwigshafen am Rhein (DE)

(72) Inventors: Johannes Poppenberg, Wyandotte, MI (US); Sebastian Richter, Shanghai (CN); Elmar Poeselt, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 507 days.

(21) Appl. No.: 16/766,180

(22) PCT Filed: Dec. 13, 2018

(86) PCT No.: PCT/EP2018/084716
§ 371 (c)(1),
(2) Date: May 21, 2020

(87) PCT Pub. No.: WO2019/115678
PCT Pub. Date: Jun. 20, 2019

(65) Prior Publication Data
US 2020/0362086 A1   Nov. 19, 2020

(30) Foreign Application Priority Data

Dec. 14, 2017 (EP) ..................................... 17207183

(51) Int. Cl.
| | | |
|---|---|---|
| *C08G 18/32* | (2006.01) | |
| *C08G 18/42* | (2006.01) | |
| *C08G 18/66* | (2006.01) | |
| *C08G 18/76* | (2006.01) | |
| *C08J 9/12* | (2006.01) | |
| *C08J 9/18* | (2006.01) | |

(52) U.S. Cl.
CPC ..... *C08G 18/3203* (2013.01); *C08G 18/4244* (2013.01); *C08G 18/4277* (2013.01); *C08G 18/664* (2013.01); *C08G 18/7671* (2013.01); *C08J 9/125* (2013.01); *C08J 9/18* (2013.01); *C08G 2110/0058* (2021.01); *C08G 2110/0066* (2021.01); *C08J 2203/10* (2013.01); *C08J 2375/04* (2013.01)

(58) Field of Classification Search
CPC ........... C08G 18/3203; C08G 18/4244; C08G 18/4277; C08G 18/664; C08G 18/7671; C08G 2110/0058; C08G 2110/0066; C08J 9/125; C08J 9/16; C08J 9/18; C08J 2203/10; C08J 2375/04
See application file for complete search history.

(56) References Cited

U.S. PATENT DOCUMENTS

| | | |
|---|---|---|
| 4,131,731 A | 12/1978 | Lai et al. |
| 5,498,747 A | 3/1996 | Pohl et al. |
| 5,811,506 A | 9/1998 | Slagel |
| 6,008,312 A | 12/1999 | Shirasaka |
| 6,166,135 A | 12/2000 | Kaufhold et al. |
| 6,184,410 B1 | 2/2001 | Bollmann et al. |
| 6,323,299 B1 | 11/2001 | Handlin et al. |
| 6,365,674 B1* | 4/2002 | Kaufhold ............ C08G 18/6204 525/131 |
| 6,730,807 B1 | 5/2004 | Haeberle et al. |
| 8,859,692 B2 | 10/2014 | Hilmer |
| 9,422,393 B2 | 8/2016 | Mather et al. |
| 9,593,199 B2 | 3/2017 | Wamprecht et al. |
| 2001/0053841 A1 | 12/2001 | Kaufhold et al. |
| 2003/0180505 A1 | 9/2003 | Abe et al. |
| 2009/0149622 A1 | 6/2009 | Sonnenschein et al. |
| 2010/0109200 A1 | 5/2010 | Cox et al. |
| 2010/0113733 A1 | 5/2010 | Cox et al. |
| 2013/0102723 A1* | 4/2013 | Wamprecht ............ C08L 83/04 525/453 |
| 2015/0038605 A1 | 2/2015 | Baghdadi |

(Continued)

FOREIGN PATENT DOCUMENTS

| | | |
|---|---|---|
| DE | 198 21 668 A1 | 11/1999 |
| DE | 100 04 328 A1 | 8/2001 |

(Continued)

OTHER PUBLICATIONS

International Search Report dated Mar. 4, 2019 in PCT/EP2018/084716 filed Dec. 13, 2018.
International Preliminary Report on Patentability dated Apr. 2, 2020 in PCT/EP2018/084716 filed Dec. 13, 2018.
Zweifel, "Plastics Additives Handbook", 5th Edition, Hanser, Hanser Publishers, Munich, Hanser Gardner Publications, Inc., Cincinnati, 2001, pp. 1-29.
Perstorp: "Material Safety Data Sheet", Mar. 1, 2020 (Mar. 1, 2020),XP055674679, Retrieved from the Internet: URL:https//www.tri-iso.com/documents/Perstorp_Capa_2202A_MSDS.pdf [retrieved on Mar. 9, 2020].

(Continued)

*Primary Examiner* — John M Cooney
(74) *Attorney, Agent, or Firm* — Grüneberg and Myers, PLLC

(57) ABSTRACT

The present invention is directed to a method for preparing a thermoplastic polyurethane having a low glass transition temperature. The process according to the present invention comprises the steps of providing at least one polyol composition (P) comprising a poly-ε-caprolactone polyol (P1), and a second polyol (P2) which is different from the first polyol (P1), and reacting the at least one polyol composition (P) with at least one polyisocyanate (PI) and at least one low molecular weight diol (CE) optionally in the presence of at least one catalyst (CA) and/or at least one additive (AD) to obtain a thermoplastic polyurethane. The present invention is also directed to the thermoplastic polyurethane obtained according to the process of the present invention and the use thereof in extruded articles and injection molded articles.

12 Claims, No Drawings

(56) References Cited

U.S. PATENT DOCUMENTS

| | | |
|---|---|---|
| 2016/0108198 A1 | 4/2016 | Watkins et al. |
| 2016/0271847 A1 | 9/2016 | Watkins et al. |
| 2016/0333134 A1 | 11/2016 | Hieber et al. |
| 2017/0036377 A1 | 2/2017 | Baghdadi et al. |
| 2017/0081463 A1* | 3/2017 | Wamprecht .......... C08G 18/667 |

FOREIGN PATENT DOCUMENTS

| | | |
|---|---|---|
| EP | 0 090 444 A2 | 10/1983 |
| EP | 0 940 389 B1 | 5/2003 |
| GB | 1 256 900 | 12/1971 |
| WO | WO 03/076542 A1 | 9/2003 |
| WO | WO 2005/023920 A1 | 3/2005 |
| WO | WO 2007/041049 A1 | 4/2007 |
| WO | WO 2007/082838 A1 | 7/2007 |
| WO | WO 2008/121133 A1 | 10/2008 |
| WO | WO 2008/121579 A1 | 10/2008 |
| WO | WO 2010/136398 A1 | 12/2010 |
| WO | WO 2013/153190 A1 | 10/2013 |
| WO | WO 2014/150119 A1 | 9/2014 |
| WO | WO 2014/150124 A1 | 9/2014 |
| WO | WO 2014/198779 A1 | 12/2014 |
| WO | WO 2015/055811 A1 | 4/2015 |
| WO | WO 2015/059024 A1 | 4/2015 |
| WO | WO 2016/131671 A1 | 8/2016 |
| WO | WO 2017/030835 A1 | 2/2017 |
| WO | WO 2017/116798 A1 | 7/2017 |
| WO | WO 2017/144502 A1 | 8/2017 |

OTHER PUBLICATIONS

U.S. Appl. No. 16/078,070, filed Aug. 21, 2018, U.S-2019-0300705 A1, Dabbous. R.
U.S. Appl. No. 16/078,041, filed Aug. 21, 2018, U.S.2019-0055341-A1, Prissok, F.
U.S. Appl. No. 16/348,259, filed May 8, 2019, US-2019-0316014-A1, Albuerne, J.
U.S. Appl. No. 16/346,715, filed May 1, 2019, US-2019-0276582-A1, Poppenberg, J.
U.S. Appl. No. 16/347,011, filed May 2, 2019, US-2019-0270841-A1, Poppenberg, J.
U.S. Appl. No. 16/462,977, filed May 22, 2019, US-2019-0322794-A1, Richter, S.
U.S. Appl. No. 16/478,701, filed Jul. 17, 2019, US-2019-0367660-A1, Roy, N.
U.S. Appl. No. 16/349,339, filed May 13, 2019, US-2019-0345284-A1, Gutmann, P.
U.S. Appl. No. 16/481,709, filed Jul. 29, 2019, US-2019-0389999-A1, Roy, N.
U.S. Appl. No. 16/632,230, filed Jan. 17, 2020, Jaehnigen, J.
U.S. Appl. No. 16/484,658, filed Aug. 8, 2019, US-2020-0048396-A1, Richter, S.
U.S. Appl. No. 16/482,951, filed Aug. 1, 2019, US-2020-0010607-A1, Hollmann, R.
U.S. Appl. No. 16/349,798, filed May 14, 2019, US-2019-0359823, Tomovic, Z.
U.S. Appl. No. 16/478,588, filed Jul. 17, 2019, US-2020-0040127-A1, Thielbeer, F.
U.S. Appl. No. 16/623,651, filed Dec. 17, 2019, Schaefer, F.
U.S. Appl. No. 16/766,180, filed May 21, 2020, Poppenberg, J.
U.S. Pat. No. 10,302,0440, May 28, 2019, US-2018-0274477-A1, Asano, M.
Per Client, U.S. Appl. No. 16/086,667, filed Sep. 20, 2018, US2019-0071535, Poeselt, E.

* cited by examiner

METHOD FOR PREPARING A THERMOPLASTIC POLYURETHANE HAVING A LOW GLASS TRANSITION TEMPERATURE

The present invention is directed to a method for preparing a thermoplastic polyurethane having a low glass transition temperature.

BACKGROUND OF THE INVENTION

Polyurethanes are of great importance in industry due to their excellent mechanical properties and their ability to be produced at low cost. Their mechanical properties can be varied widely via the use of different chemical structural components. The growth of thermoplastic polyurethane has been highly dependent on the cheap and available feedstock—polyisocyanates, polyols and chain extenders.

Polyurethane elastomers are classified into castable polyurethanes, millable polyurethanes and thermoplastic polyurethanes. The castable and thermoplastic polyurethanes are known to be representative examples of segmented elastomers such as thermoplastic elastomers and have both rubber elasticity and wear resistance and strength.

Polyols are the largest volume raw material used in thermoplastic polyurethane applications. The polyols, as the name suggests, refer simply to polymer backbones containing nominally two or more hydroxyl groups and provide softness and flexibility in urethane formulation thereby constituting the soft segment of the thermoplastic polyurethane. When properties such as tear strength and wear resistance are important, polyurethanes have been used which comprise soft segments comprising a crystallisable long polyol chain such as polyethylene glycol adipate, polybutylene glycol adipate, polyhexanediol adipate, poly-ε-caprolactone and hard segments comprising a polyisocyanate and a short chain polyol and polyamine, with the hard segments preventing the crystallization of the soft segments.

U.S. Pat. No. 9,593,199 B2 describes a method for producing a thermoplastic polyurethane elastomer, comprising the reaction of at least A) one organic diisocyanate containing two isocyanate groups with B) a polyol having a number-average molecular weight Mn≥500 and ≤5000 g/mol, and optionally D) a monofunctional chain stopper, which has one isocyanate-reactive group, and/or E) a catalyst, wherein the molar ratio of the isocyanate groups from A) to the sum of the groups reactive to isocyanate in B), C), and, if applicable, D) is ≥0.9:1 and ≤1.2:1, and component B) contains at least one polyether carbonate polyol, which can be obtained by adding carbon dioxide and alkylene oxides to H-functional starter substances. Further disclosed is the use of said thermoplastic polyurethane elastomer to produce extruded or injection molded items, and the items produced by extrusion or injection molding.

U.S. Pat. No. 6,008,312 A describes a method for producing millable polyurethanes by first producing a poly-ε-caprolactone based diol, the poly-ε-caprolactone based diol containing a controlled average number of caprolactone units and having a molecular weight distribution; and reacting the poly-ε-caprolactone based diol with a diisocyanate to produce a polyurethane with a restricted crystallizability having a rubber elasticity. The resulting millable polyurethanes exhibit excellent hydrolysis resistance, show no crystallization at low temperatures and have excellent mechanical properties.

A water triggered shape memory polymer based on poly-ε-caprolactone (PCL) and poly(ethylene glycol) (PEG) multiblock hybrid thermoplastic polyurethane is disclosed in U.S. Pat. No. 9,422,393 B2. Urethane linkages were formed through the addition reaction between isocyanate groups of the lysine methyl-ester diisocyanate (LDI) and the hydroxyl groups of either (PEG) or PCL diol.

U.S. Pat. No. 8,859,692 B2 discloses a process for reacting thermoplastic polyurethanes with compounds having isocyanate groups, wherein the reaction is carried out in the presence of a prepolymer which is the reaction product of (a) isocyanates with (b) compounds which are reactive toward isocyanates and have a molecular weight in the range from 500 g/mol to 10 000 g/mol, preferably from 2000 g/mol to 8000 g/mol, and the prepolymer has a glass transition temperature $T_g$ measured by means of DSC in accordance with DIN EN ISO 11357-1 below −35° C.

Another U.S. Pat. No. 6,323,299 B1 describes a process for preparing a thermoplastic polyurethane resin from a polydiene having terminal functional groups selected from the group consisting of hydroxy, amine, and carboxylic acid, at least one polymeric diol selected from the group consisting of polyester polyols, polyether polyols, and polycarbonate polyols, an isocyanate having an average functionality of 2, and a chain extender. The said process involves the steps of forming a prepolymer by first reacting the polydiene and isocyanate and thereafter reacting it with the polymeric diol.

The existing methods for preparing thermoplastic polyurethane and the thermoplastic polyurethane itself do not report the soft phase crystallization which impairs the cold flexibility at low temperatures. Moreover, unsatisfactory mechanical performance is integral to these thermoplastic polyurethanes, especially at very low Tg values.

Thus, it was an objective of the presently claimed invention to provide a method for preparing a thermoplastic polyurethane which minimizes or circumvents the occurrence of soft phase crystallization and further improves the mechanical performance of the resulting thermoplastic polyurethane for low temperature operation, thereby rendering it suitable for applications such as, but not limited to, extrusion, injection molding article, expanded foam and expanded particle foam.

According to the present invention, this object is solved by a method for preparing a thermoplastic polyurethane, comprising the steps of:
 (A) providing at least one polyol composition (P) comprising
  (P1) a poly-ε-caprolactone polyol, and
  (P2) a second polyol (P2) which is different from the first polyol (P1),
 (B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane,
wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

SUMMARY OF THE INVENTION

Surprisingly, it has been found that a method for preparing a thermoplastic polyurethane comprising at least one polyol composition having a number average molecular weight Mn in the range of ≥1500 g/mol to ≤10,000 g/mol determined according to DIN 55672-1 and comprising a poly-ε-caprolactone polyol results in a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode and improved mechanical performance such as, but not limited to, tensile strength, elongation at break, tear propagation and abrasion resistance.

The present invention is directed to a method for preparing a thermoplastic polyurethane, comprising the steps of:
(A) providing at least one polyol composition (P) comprising
  (P1) a poly-ε-caprolactone polyol, and
  (P2) a second polyol (P2) which is different from the first polyol (P1),
(B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane,
wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

Furthermore, the presently claimed invention is also directed to a method for preparing a thermoplastic polyurethane, comprising the steps of:
(A) providing at least one polyol composition (P) comprising
  (P1) a poly-ε-caprolactone polyol,
(B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a Tg in the range of ≥−60° C. to ≤10° C. determined by dynamic mechanical thermal analysis according to DIN EN ISO 6721-1:2011-08 at a heating rate of 2 K/min and 1 Hz torsion mode,
wherein the at least one polyol composition (P) has a number average molecular weight Mn in the range of ≥1500 g/mol to ≤10,000 g/mol determined according to DIN 55672-1: 2016-03, and
wherein the at least one low molecular weight diol (CE) has a molecular weight in the range of ≥50 g/mol to ≤350 g/mol.

In another aspect of the present invention, a thermoplastic polyurethane obtained by the method described hereinabove, has a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode and a hard segment fraction in the range of ≥0.1 to ≤0.7, the hard segment fraction being defined by the formula:

$$\text{Hard segment fraction} = \left\{\sum_{x=1}^{k} [(m_{KV,CE}/M_{KV,CE}) * M_{Iso} + m_{KV,CE}]\right\}/m_{total}$$

wherein,
$m_{KV,CE}$ is the mass of the at least one low molecular weight diol (CE) in g,
$M_{KV,CE}$ is the molar mass of the at least one low molecular weight diol (CE) in g/mol,
$M_{Iso}$ is the molar mass of the at least one polyisocyanate (PI) in g/mol,
$m_{total}$ is the total mass of all the starting materials in g,
k is the number of low molecular weight diol (CE).

In yet another aspect the present invention is directed to the use of the thermoplastic polyurethane as described hereinabove in extruded article and injection molded article.

In still another aspect, the present invention is directed to a method for producing expanded thermoplastic polyurethane particles, comprising:
(a) melting the thermoplastic polyurethane described hereinabove to obtain a melt,
(b) mixing a blowing agent with the melt obtained in step (a), and
(c) producing expanded thermoplastic polyurethane particles from the resulting melt.

In another aspect of the present invention, the present invention is directed to expanded thermoplastic polyurethane particles obtained by the method described hereinabove.

In yet another aspect of the present invention, the present invention is directed to a particle foam based on the expanded thermoplastic polyurethane particles as described hereinabove.

In still another aspect of the present invention, the present invention is directed to use of the expanded thermoplastic polyurethane particles as described hereinabove for the production of filling material for mattresses, parts of mattresses, mattresses as such, filling of tires, tires or part of tires, shoes, shoe-soles, shoe-midsoles gymnastic mats, protective clothing, cushioning elements for automotive, sound absorbers, anti-vibration devices, cushioning elements for bicycle saddles, toys, flooring or packaging materials.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

The diversity of physical and mechanical properties exhibited by thermoplastic polyurethanes (hereinafter referred as TPU) arises from their ability to incorporate other chemical structures into these polymers. It is also well-known that TPUs tend to exhibit phase separation where the soft segment, also interchangeably referred as soft phase, units confer elastomeric behaviour while the microphase rich hard segment, also interchangeably referred as hard phase, provides physical cross linking. The hard segment and the soft segment do no generally mix. Thus, during cooling from above a particular temperature, spontaneous segregation of the soft segment and hard segment into separate soft and hard phases occurs. The prevalence of these segments and their fraction determines the properties exhibited by the final TPU.

The thermoplastic polyurethane, as described hereinbelow, is a segmented thermoplastic polyurethane. For the purpose of the present invention, the soft segment is comprised of at least one polyol composition (P), as discussed hereinabove, while the hard segment is derived from the at least one polyisocyanate (PI) structure linked by the at least one low molecular weight diol (CE). The soft segment imparts amorphous properties to the TPU, while the hard segment imparts partially crystalline nature to the polyurethane. The soft segments primarily influence the elastic nature and low temperature performance while the hard segments particularly affect the modulus, hardness and upper-use temperature by their ability to remain associated. Thus, to obtain a TPU which minimizes or in fact prevents the occurrence of soft phase crystallization and further improves the mechanical performance of the resulting thermoplastic polyurethane for low temperature operation, the soft and hard segment fractions needs to be adjusted.

According to the present invention, it was surprisingly found that the method for preparing a thermoplastic polyurethane, comprising the steps of:
- (A) providing at least one polyol composition (P) comprising
  - (P1) a poly-ε-caprolactone polyol, and
  - (P2) a second polyol (P2) which is different from the first polyol (P1),
- (B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane, wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol, results in a thermoplastic polyurethane with a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode.

Accordingly, a method for preparing a thermoplastic polyurethane according to the presently claimed invention also may comprise the steps of:
- (A) providing at least one polyol composition (P) comprising
  - (P1) a poly-ε-caprolactone polyol,
- (B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode, wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

According to a further embodiment, the present invention is also directed to a method for preparing a thermoplastic polyurethane, comprising the steps of:
- (A) providing at least one polyol composition (P) comprising
  - (P1) a poly-ε-caprolactone polyol, and
  - (P2) a second polyol (P2) which is different from the first polyol (P1),
- (B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode, wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

In the thermoplastic polyurethane or TPU, as described hereinabove, the term "polyol" refers to polymer backbones containing nominally two or more hydroxyl groups, sometimes also referred as polyalcohol. According to step (A) of the present invention, at least one polyol composition (P) is provided comprising at least a poly-ε-caprolactone polyol as component (P1) and preferably also a second polyol (P2) which is different from the first polyol (P1).

According to a further embodiment, the present invention therefore is also directed to the method as disclosed above, characterized in that the weight ratio between the poly-ε-caprolactone polyol (P1) and the second polyol (P2) in the polyol composition (P) is in the range of ≥1:5 to ≤10:1.

In step (A) of the above described method, the at least one polyol composition (P) has a number average molecular weight Mn in the range of ≥1500 g/mol to ≤10,000 g/mol determined according to DIN 55672-1: 2016-03 and an OH value in the range of ≥10 mg KOH/g to ≤100 mg KOH/g determined according to DIN 53240-3:2016-03. Preferably, the number average molecular weight is in the range of ≥1500 g/mol to ≤9,000 g/mol determined according to DIN 55672-1: 2016-03. More preferably, it is in the range of ≥1500 g/mol to ≤8,000 g/mol determined according to DIN 55672-1: 2016-03. Most preferably, it is in the range of ≥1500 g/mol to ≤7,000 g/mol, or ≥1500 g/mol to ≤6,000 g/mol, or ≥1500 g/mol to ≤5,000 g/mol determined according to DIN 55672-1: 2016-03. In an embodiment, the at least one polyol composition (P) has a number average molecular weight Mn in the range of ≥1500 g/mol to ≤4,000 g/mol determined according to DIN 55672-1: 2016-03.

The at least one polyol composition (P), as described hereinabove, comprises a poly-ε-caprolactone polyol (P1). For the purpose of the present invention, the poly-ε-caprolactone polyol (P1), also interchangeably referred as polycaprolactone, preferably has a number average molecular weight in the range of ≥1500 g/mol to ≤2500 g/mol determined according to DIN 55672-1: 2016-03. Although, a person skilled in the art is well aware of the different poly-ε-caprolactone polyols available to him, the present invention TPU preferably employs a poly-ε-caprolactone polyol (P1) which is obtained or obtainable by reacting ε-caprolactone (P11) and a starter molecule (P12) having a number average molecular weight Mn in the range of ≥80 g/mol to ≤1500 g/mol as determined according to DIN 55672-1: 2016-03.

According to a further embodiment, the present invention therefore is also directed to the method as disclosed above, characterized in that the polyol (P1) has a number average molecular weight in the range of ≥1500 g/mol to ≤2500 g/mol determined according to DIN 55672-1: 2016-03.

The starter molecule (P12), as described hereinabove, is a difunctional starter having a number average molecular weight Mn in the range of ≥80 g/mol to ≤1500 g/mol as determined according to DIN 55672-1: 2016-03. Preferably, the molecular weight is in the range of ≥80 g/mol to ≤1500 g/mol, or ≥200 g/mol to ≤1500 g/mol as determined according to DIN 55672-1: 2016-03. More preferably, the molecular weight is in the range of ≥200 g/mol to ≤1400 g/mol, or ≥300 g/mol to ≤1400 g/mol, or ≥300 g/mol to ≤1400 g/mol, or ≥400 g/mol to ≤1400 g/mol, or ≥400 g/mol to ≤1300 g/mol, ≥500 g/mol to ≤1300 g/mol, or ≥600 g/mol to ≤1300 g/mol as determined according to DIN 55672-1: 2016-03. Most preferably, the molecular weight is in the range of ≥700 g/mol to ≤1300 g/mol, or ≥800 g/mol to ≤1300 g/mol, or ≥800 g/mol to ≤1200 g/mol, or ≥900 g/mol to ≤1200 g/mol as determined according to DIN 55672-1: 2016-03. In an embodiment, the starter molecule (P12) has a number average molecular weight Mn in the range of ≥900 g/mol to ≤1100 g/mol as determined according to DIN 55672-1: 2016-03. According to a further embodiment, the present invention therefore is also directed to the method as disclosed above, characterized in that the second polyol (P2) has a number average molecular weight Mn in the range of ≥1000 g/mol to ≤4000 g/mol determined according to DIN 55672-1: 2016-03.

Suitable starter molecule (P12) for the purpose of the present invention include diols selected from the group consisting of neopentyl glycol, 1,4-butanediol, 1,6-hexanediol, polyethylene glycol, polypropylene glycol, α-hydro-ω-hydroxypoly(oxytetra-methylene) diol and α-hydro-ω-hydroxypoly(oxytri-methylene) diol.

More preferably, the starter molecule (P12) is selected from the group consisting of 1,6-hexanediol, polyethylene glycol, polypropylene glycol, α-hydro-ω-hydroxypoly(oxytetra-methylene) diol and α-hydro-ω-hydroxypoly(oxytri-methylene) diol.

Most preferably, the starter molecule (P12) is selected from the group consisting of polyethylene glycol, polypropylene glycol, α-hydro-ω-hydroxypoly(oxytetra-methylene) diol and α-hydro-ω-hydroxypoly(oxytri-methylene) diol.

According to a further embodiment, the present invention therefore is also directed to the method as disclosed above, characterized in that the starter molecule (P12) in the poly-ε-caprolactone polyol (P1) in step (A) is selected from the group consisting of neopentyl glycol, 1,4-butanediol, 1,6-hexanediol, polyethylene glycol, polypropylene glycol, α-hydro-ω-hydroxypoly(oxytetra-methylene) diol and α-hydro-ω-hydroxypoly(oxytri-methylene) diol.

In an embodiment, the starter molecule (P12) is α-hydro-ω-hydroxypoly(oxytetra-methylene) diol. The α-hydro-ω-hydroxy-poly(oxytetra-methylene) diol, also known as polytetramethylene glycol, is obtained by ring-opening polymerisation of tetrahydrofuran with the aid of highly acidic catalysts.

According to a further embodiment, the present invention therefore is also directed to the method as disclosed above, characterized in that in step (A) the poly-ε-caprolactone polyol (P1) is obtained by reacting ε-caprolactone (P11) and a starter molecule (P12) having a number average molecular weight in the range of ≥80 g/mol to ≤1500 g/mol as determined according to DIN 55672-1:2016-03.

The poly-ε-caprolactone polyol (P1) in the at least one polyol composition (P) of step (A) preferably is a block copolymer synthesized from ε-caprolactone (P11) and the starter molecule (P12), as described hereinabove. More preferably, the poly-ε-caprolactone polyol (P1) is a A-B-A triblock copolymer, wherein A represents the ε-caprolactone (P11) while the starter molecule (P12) is represented by B. The presence of the at least one polyol composition (P) as the poly-ε-caprolactone polyol (P1) triblock copolymer, as described hereinabove, contributes in preventing the soft phase crystallization of the thermoplastic polyurethane obtained therefrom, with good mechanical and physical properties.

In a particularly preferable embodiment, the poly-ε-caprolactone polyol (P1) comprises a (P11)-(P12)-(P11) triblock copolymer. In this manner, the resulting polyol comprises the starter molecule (P12) as a core which is extended by means of the ε-caprolactone (P11). The choice of the poly-ε-caprolactone polyol (P1), as described hereinabove, is independent of the method for obtaining the same. A person skilled in the art is well aware of these techniques. Commercially available poly-ε-caprolactone polyol (P1) such as, but not limited to, Capa™ from Perstorp can also be employed.

The poly-ε-caprolactone polyol (P1) in step (A), as described hereinabove, preferably has a weight ratio between the ε-caprolactone (P11) and the starting molecule (P12) in the range of ≥1:10 to ≤10:1. Preferably, the weight ratio is in the range of ≥1:9 to ≤10:1, or ≥1:9 to ≤9:1, or ≥1:8 to ≤9:1. More preferably, the weight ratio is in the range of ≥1:8 to ≤8:1, or ≥1:7 to ≤8:1, or ≥1:7 to ≤7:1, or ≥1:6 to ≤7:1, or ≥1:6 to ≤6:1. Most preferably, the weight ratio is in the range of ≥1:5 to ≤6:1, or ≥1:5 to ≤5:1, or ≥1:4 to ≤5:1, or ≥1:4 to ≤4:1, or ≥1:3 to ≤4:1. In an embodiment, the weight ratio between the ε-caprolactone (P11) and the starting molecule (P12) in the poly-ε-caprolactone polyol (P1) in step (A) is in the range of ≥1:3 to ≤3:1.

According to a further embodiment, the present invention therefore is also directed to the method as disclosed above, characterized in that the poly-ε-caprolactone polyol (P1) in step (A) has a weight ratio between the ε-caprolactone (P11) and the starting molecule (P12) in the range of ≥1:10 to ≤10:1.

The at least one polyol composition (P) in step (A) of the method, as described hereinabove, preferably further comprises a second polyol (P2) which is different from the first polyol i.e. poly-ε-caprolactone polyol (P1). Although, the second polyol (P2) is different from the poly-ε-caprolactone polyol (P1), it is generally preferred to choose the second polyol (P2) which is similar or in fact same as the starter molecule (P12) in the poly-ε-caprolactone polyol (P1). This results in reduction or circumvention of the soft phase crystallization shown by the TPU comprising the second polyol only and further improves the physical and mechanical properties of the resulting TPU.

Accordingly, in an embodiment the second polyol is optionally added to the at least one polyol composition (P) in step (A) along with the poly-ε-caprolactone polyol (P1). The second polyol is selected from the group consisting of a polyether polyol (P21), polyester polyol (P22) and polycarbonate polyol (P23). The terms "polyether polyol", "polyester polyol" and "polycarbonate polyol" refer to the polyol derived from polyester, polyether and polycarbonate, respectively.

According to a further embodiment, the present invention therefore is also directed to the method as disclosed above, characterized in that the second polyol (P2) is selected from the group consisting of a polyether polyol (P21), polyester polyol (P22) and polycarbonate polyol (P23).

Therefore, in an embodiment of the present invention the method for preparing the thermoplastic polyurethane comprises the steps of:
  (A) providing at least one polyol composition (P) comprising
    (P1) a poly-ε-caprolactone polyol, and
    (P2) a second polyol, and (B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode, wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

Suitable polyols are generally known to the person skilled in the art.

The second polyol (P2), as described hereinabove, preferably has a number average molecular weight Mn in the range of ≥1000 g/mol to ≤4000 g/mol determined according to DIN 55672-1: 2016-03. Preferably, the molecular weight is in the range of ≥1000 g/mol to ≤3500 g/mol determined according to DIN 55672-1: 2016-03. More preferably, the molecular weight is in the range of ≥1000 g/mol to ≤3000 g/mol determined according to DIN 55672-1: 2016-03. Most preferably, the molecular weight is in the range of ≥1000 g/mol to ≤2500 g/mol determined according to DIN 55672-1: 2016-03.

According to a further embodiment, the present invention therefore is also directed to the method as disclosed above, characterized in that the second polyol (P2) has a number average molecular weight Mn in the range of ≥1000 g/mol to ≤4000 g/mol determined according to DIN 55672-1: 2016-03.

Suitable polyether polyols, polyester polyols or polycarbonate polyols are known to the person skilled in the art. Typically, the polyether polyol (P21) is obtained by known methods, such as but not limited to, anionic polymerization of alkylene oxides with addition of at least one starter molecule which comprises from 2 to 8, preferably from 2 to 6, reactive hydrogen atoms in bound form in the presence of catalysts. As catalysts, it is possible to use alkali metal hydroxides such as, but not limited to, sodium or potassium hydroxide or alkali metal alkoxides, such as but not limited to, sodium methoxide, sodium or potassium ethoxide or potassium isopropoxide or, in the case of cationic polymerization, Lewis acids such as antimony pentachloride, boron trifluo-ride etherate or bleaching earth catalysts. Furthermore, double metal cyanide (or DMC) compounds can also be used as catalysts, as already described hereinabove.

Other suitable polyether polyols (P21) include polyether diols and triols, such as polyoxypropyl-ene diols and triols and poly(oxyethylene-oxypropylene)diols and triols obtained by the simultaneous or sequential addition of ethylene and propylene oxides to di- or tri-functional initiators. Copolymers having oxyethylene contents in the range of ≥5 wt.-% to ≤90 wt.-%, based on the weight of the polyol component, of which the polyols may be block copolymers, random/block copolymers or random copolymers, can also be used.

Preferably, the second polyol (P2) comprising the polyether polyol (P21) is derived from the group consisting of ethylene oxide, propylene oxide, butylene oxide, tetrahydrofuran (hereinafter referred to as THF) and a mixture thereof. By the term "derived", as used herein, it refers to the building block of the polyether polyol.

For the purpose of the present invention, suitable polyether polyols (P21) include polytetramethylene glycols obtained by the polymerization of cyclic ether, tetrahydrofuran. Polytetramethylene glycol or α-hydro-ω-hydroxypoly(oxytetra-methylene) diol having a number average molecular weight in the range of ≥1500 g/mol to ≤2500 g/mol as determined according to DIN 55672-1: 2016-03 are particularly preferable as polyether polyol (P21). Mixtures of two or more α-hydro-ω-hydroxypoly(oxytetra-methylene) diols having differing molecular weights are also employable in the context of the present invention. The choice of suitable polyether polyol (P21), as described hereinabove, is independent of the method for obtaining the same. Accordingly, a person skilled in the art is well aware of such polyether polyols (P21). However, commercially available polyether polyols (P21) such as, but not limited to, PolyTHF® from BASF can also be employed.

Accordingly, in a further embodiment the method for preparing the thermoplastic polyurethane comprises the steps of:
(A) providing at least one polyol composition (P) comprising
(P1) a poly-ε-caprolactone polyol, and
(P21) a polyether polyol, and
(B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode, wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

In another embodiment, the method for preparing the thermoplastic polyurethane comprises the steps of:
(A) providing at least one polyol composition (P) comprising
(P1) a poly-ε-caprolactone polyol, and
(P21) α-hydro-ω-hydroxypoly(oxytetra-methylene) diol, and
(B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode, wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

Polyester polyol (P22) as suitable second polyol for the present invention comprise for example of at least one $C_4$ to $C_{12}$ dicarboxylic acid and at least one $C_2$ to $C_{14}$ diol. The at least one $C_4$ to $C_{12}$ dicarboxylic acid is selected from the group consisting of aliphatic dicarboxylic acid such as succinic acid, glutaric acid, adipic acid, suberic acid, azelaic acid and sebacic acid and aromatic dicarboxylic acid such as phthalic acid, isophthalic acid and terephthalic acid. The carboxylic acids can be utilized individually or in the form of mixtures, for example, a mixture succinic acid, glutaric acid and adipic acid. Preferably $C_2$ to $C_6$ diol such as ethylene glycol, diethylene glycol, 1,4-butanediol, 1,5-pentanediol, 1,6-hexanediol, 1,10-decanediol, 2,2-dimethylpropane-1,3-diol, 1,3-propanediol, 2-methyl-1,3-propanediol and dipropylene glycol can be used individually or as mixtures.

Alkoxylated diols obtained by alkoxylation of a diol with at least one $C_2$ to $C_4$ alkylene oxide can also be employed as suitable polyester polyol (P22) in the present invention. By the term "alkoxylated", it is referred to the end capping of the at least one $C_2$ to $C_{14}$ diol by suitable alkylene oxides such as, but not limited to, at least one $C_2$ to $C_4$ alkylene oxide in an alkoxylation reaction. Preferably, the reaction between the at least one $C_2$ to $C_{14}$ diol with the at least one $C_2$ to $C_4$ alkylene oxide is carried out in the presence of at least one catalyst.

Preferably the at least one catalyst is a base or a double metal cyanide catalyst (DMC catalyst). More preferably the at least one catalyst is selected from the group consisting of alkaline earth metal hydroxides such as calcium hydroxide, strontium hydroxide and barium hydroxide, alkali metal hydroxides such as lithium hydroxide, sodium hydroxide, potassium hydroxide, rubidium hydroxide and caesium hydroxide and alkali metal alkoxylates such as potassium tert-butoxylate. Most preferably the at least one catalyst is potassium hydroxide or caesium hydroxide.

In case the catalyst is a base, any inert solvents capable of dissolving alkoxylated $C_2$ to $C_{14}$ diol may be used as solvents during the reaction or as solvents required for working up the reaction mixture in cases where the reaction is carried out without solvents. The following solvents are mentioned as examples: toluene, methylene chloride, trichloroethylene, tetrahydrofuran, dioxane, methyl ethyl ketone, methylisobutyl ketone, ethyl acetate and isobutyl acetate.

In case the catalyst is a base, the amount of catalysts used is preferably in the range $\geq 0.01$ wt.-% to $\leq 3.0$ wt.-%, more preferably in the range $\geq 0.05$ wt.-% to $\leq 2.0$ wt.-%, based on the total amount of the alkoxylated $C_2$ to $C_{14}$ diol. The reaction is preferably carried out at a temperature in the range of 70 to 200° C., more preferably from 100 to 160° C. The pressure is preferably in the range from 1 bar to 50 bar, more preferably in the range from 1 bar to 40 bar, even more preferably in the range from 1 bar to 30 bar or 2 bar to 30 bar. Particularly, the pressure is in the range from 3 bar to 30 bar.

The alkoxylated $C_2$ to $C_{14}$ diol may also be obtained from DMC catalysts. The DMC catalysts are usually prepared as a solid and used as such. The catalyst is typically used as powder or in suspension. However, other ways known to those skilled in the art for using catalysts can likewise be employed. The DMC catalyst can be dispersed with an inert or non-inert suspension medium which can be, for example, the product to be produced or an intermediate by suitable measures, e.g. milling. The suspension produced in this way is used, if appropriate after removal of interfering amounts of water by methods known to those skilled in the art, e.g. stripping with or without use of inert gases such as nitrogen and/or noble gases. Suitable suspension media are, for example, toluene, xylene, tetrahydrofuran, acetone, 2-methylpentanone, cyclo-hexanone and also polyether alcohols and mixtures thereof. The catalyst is preferably used in a suspension in the polyester polyol as described, for example, in EP 0 090 444 A.

Polycarbonate polyol (P23) as suitable second polyol (P2) in the at least one polyol composition (P) of step (A) may be obtained by, such as but not limited to, the reaction of phosgene or a carbonate monomer, usually dimethyl carbonate with a diol monomer or a mixture of diol monomers. Alternatively, suitable hydroxyl terminated polycarbonates include those prepared by reacting a glycol with a carbonate. U.S. Pat. No. 4,131,731 describes such hydroxyl terminated polycarbonates. The polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Suitable diols include aliphatic diols containing 4 to 12 carbon atoms such as 1,4-butanediol, 1,5-pentanediol, neopentyl glycol, 1,6-hexanediol, 1,6-2,2,4-trimethylhexanediol, 1,10-decanediol, hydrogenated dilinoleylglycol, hydrogenated dioleylglycol; and cycloaliphatic diols such as 1,3-cyclohexanediol, 1,4-dimethylolcyclohexane, 1,4-cyclohexanediol, 1,3-dimethylolcyclohexane, 1,4-endo methylene-2-hydroxy-5-hydroxymethyl cyclohexane, and polyalkylene glycol. The diols used in the reaction may be a single diol or a mixture of diols depending on the properties desired in the finished product. Polycarbonate intermediates which are hydroxyl terminated are generally those known to a person skilled in the art. Suitable carbonates are selected from alkylene carbonates composed of a 5 to 7-member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate and 2,4-pentylene carbonate. Also, suitable herein are dialkylcarbonates, cycloaliphatic carbonates and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure and there can be one or two of such structures. When one group is cycloaliphatic, the other can be either alkyl or aryl. On the other hand, if one group is aryl, the other can be alkyl or cycloaliphatic. Examples of suitable diarylcarbonates which can contain 6 to 20 carbon atoms in each aryl group, are diphenylcarbonate, ditolylcarbonate and dinaphthylcarbonate.

The weight ratio of the components of composition (P) may vary in broad ranges. The polyol composition may also comprise further polyols or solvents.

The weight ratio between the poly-ε-caprolactone polyol (P1) and the second polyol (P2) in the at least one polyol composition (P) of step (A), as described hereinabove, is in the range of $\geq 1:5$ to $\leq 10:1$. Preferably, the weight ratio is in the range of $\geq 1:5$ to $\leq 9.5:1$, or $\geq 1:5$ to $\leq 9:1$, or $\geq 1:5$ to $\leq 8.5:1$. More preferably, the ratio is in the range of $\geq 1:4$ to $\leq 8:1$, or 1:4 to $\leq 7.5:1$, or $\geq 1:4$ to $\leq 7:1$, or $\geq 1:4$ to $\leq 6.5:1$, or $\geq 1:4$ to $\leq 6:1$, or $\geq 1:4$ to $\leq 5.5:1$. Most preferably, the ratio is in the range of $\geq 1:3$ to $\leq 5:1$, or $\geq 1:3$ to $\leq 4.5:1$, or $\geq 1:3$ to $\leq 4:1$, or $\geq 1:3$ to $\leq 3.5:1$. In an embodiment, weight ratio between the poly-ε-caprolactone polyol (P1) and the second polyol (P2) is in the range of $\geq 1:3$ to $\leq 3:1$.

According to the present invention, according to step (B), the at least one polyol composition (P) of step (A) is reacted with the at least one polyisocyanate (PI) and the at least one low molecular weight diol (CE) in the step (B), as described hereinabove. Optionally, the step (B) proceeds in presence of the at least one catalyst (CA) and/or the at least one additive (AD). The ingredients for preparing the thermoplastic polyurethane are preferably reacted simultaneously. By the term "simultaneously", it refers to the ingredients viz. the at least one polyol composition (P), the at least one polyisocyanate (PI), the at least one low molecular weight diol (CE), optionally the at least one catalyst (CA) and/or the at least one additive (AD) being reacted together at once. For instance, the at least one polyol composition (P), the at least one polyisocyanate (PI) and the at least one chain extender are reacted simultaneously in step (B) above. If required, the at least one catalyst (CA) and/or the at least one additive (AD) may also be optionally reacted simultaneously along with the others. This makes the process of the present invention a one-shot process for preparing thermoplastic polyurethane. This is another objective of the present invention to provide a one-shot method as an alternative to a two-shot method.

As the name suggests, the one-shot process is a single step process and involves the simultaneous addition of the at least one polyol composition (P), the at least one polyisocyanate (PI) and the at least one low molecular weight diol, as described above in step (B). Accordingly, in a further embodiment of the present invention, the present invention is directed to a one-shot process for preparing the thermoplastic process comprises the steps of:
(A) providing at least one polyol composition (P) comprising
(P1) a poly-ε-caprolactone polyol, and
(B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode, wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

According to the present invention, the polyol composition (P) is reacted with at least one polyisocyanate (PI). The term "polyisocyanate", as used herein, refers to an isocyanate comprising at least two N=C=O groups, such as diisocyanates or triisocyanates, as well as dimers and trimers or biurets of the isocyanates discussed herein. Preferably, the NCO groups or functionality of the at least one polyisocyanate (PI) is in the range of ≥1.5 to ≤2.2. More preferably, it is in the range of ≥1.9 to ≤2.1. Most preferably, in the range of ≥1.9 to ≤2.1.

The most chemically relevant attribute of isocyanate chemistry is its reactivity with molecules having active hydrogens. Such active hydrogens are typically found on molecules having alcohol and amine functionalities and water.

Suitable conditions for step (B) are generally known to the person skilled in the art.

The temperature in step (B) is preferably in the range of ≥70° C. to ≤120° C. Optionally, the ingredients in step (B) i.e. the at least one polyisocyanate (PI) the at least one low molecular weight diol (CE), the at least one polyol composition (P) and optionally the at least one catalyst (CA) and/or the at least one additive are mixed by means of suitable mixers and stirrers well known to the person skilled in the art.

For the purpose of the present invention, the at least one polyisocyanate (PI) may be an aliphatic polyisocyanate (PI1), cycloaliphatic polyisocyanate (PI2), aromatic polyisocyanate (PI3) or mixtures thereof. In an embodiment, the at least one polyisocyanate (PI) is at least one diisocyanate of the abovementioned aliphatic, cycloaliphatic and aromatic polyisocyanates. Representative examples of these preferred diisocyanates may be found, for example, from U.S. Pat. Nos. 4,385,133, 4,522,975 and 5,167,899.

Suitable cycloaliphatic polyisocyanates (PI2) include those in which two or more of the isocyanato groups are attached directly and/or indirectly to the cycloaliphatic ring. Aromatic polyisocyanates (PI3) include those in which two or more of the isocyanato groups are attached directly and/or indirectly to the aromatic ring.

In an embodiment, the aliphatic polyisocyanates (PI1) and cycloaliphatic polyisocyanates (PI2) can comprise 6 to 100 carbon atoms linked in a straight chain or cyclized and having two isocyanate reactive end groups. Accordingly, the method for preparing the thermoplastic polyurethane comprising the at least one polyisocyanate (PI) as aliphatic polyisocyanate (PI1) is selected from the group consisting of tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethylhexamethylene diisocyanate, 2,4,4-trimethyl-hexamethylene diisocyanate and 2-methyl-1,5-pentamethylene diisocyanate.

The at least one polyisocyanate (PI) as cycloaliphatic polyisocyanate (PI2) is selected from the group consisting of cyclobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis(isocyanatomethyl)cyclohexane diisocyanates, 4,4'- and 2,4'-bis(isocyanato-methyl) dicyclohexane, isophorone diisocyanate and 4,4'-diisocyanatdicyclohexylmethane.

The at least one polyisocyanate (PI) as aromatic polyisocyanate (PI3) is selected from the group consisting 2,4- and 2,6-hexahydrotoluenediisocyanate, 1,2-, 1,3-, and 1,4-phenylene diisocyanates, triphenyl methane-4,4',4"-triisocyanate, naphthylene-1,5-diisocyanate, 2,4- and 2,6-toluene diisocyanate, 2,4'-, 4,4'- and 2,2-biphenyl diisocyanates, 2,2'-, 2,4'- and 4,4'-diphenylmethane diisocyanate, polyphenyl polymethylene polyisocyanates, 1,2-, 1,3- and 1,4-xylylene diisocyanates and m-tetramethylxylyene diisocyanate (TMXDI).

Preferably, the at least one polyisocyanate (PI) is selected from the group consisting of 2,2'-, 2,4'- and 4,4'-diphenylmethane diisocyanate, 2,4- and 2,6-toluene diisocyanate, 1,2-, 1,3- and 1,4-cyclohexane diisocyanates, hexamethylene 1,6-diisocyanate, 2-methyl-1,5-pentamethylene diisocyanate, pentamethylene 1,5-diisocyanate, tetramethylene 1,4-diisocyanate, isophorone diisocyanate, p-phenyl diisocyanate, o-tolidine diisocyanate and 1,5-naphthalene diisocyanate and 4,4'-Diisocyanatdicyclohexylmethane.

According to a further embodiment, the present invention therefore is also directed to the method as disclosed above, characterized in that in step (B) the at least one polyisocyanate (PI) is selected from the group consisting of 2,2'-, 2,4'- and 4,4'-diphenylmethane diisocyanate, 2,4- and 2,6-toluene diisocyanate, 1,2-, 1,3- and 1,4-cyclohexane diisocyanates, hexamethylene 1,6-diisocyanate, 2-methyl-1,5-pentamethylene diisocyanate, pentamethylene 1,5-diisocyanate, tetramethylene 1,4-diisocyanate, isophorone diisocyanate, p-phenyl diisocyanate, o-tolidine diisocyanate and 1,5-naphthalene diisocyanate and 4,4'-diisocyanatdicyclohexylmethane.

More preferably, the at least one polyisocyanate (PI) is selected from the group consisting of diphenylmethane 4,4'-diisocyanate, tolylene 2,6-diisocyanate, dicyclohexylmethane 2,2'-diisocyanate, hexamethylene 1,6-diisocyanate, tetramethylenexylene 2,4-diisocyanate and 1 isocyanato-3,3,5 trimethyl-5 isocyanatomethylcyclohexane.

Most preferably, the at least one polyisocyanate (PI) is selected from the group consisting of diphenylmethane 4,4'-diisocyanate, tolylene 2,6-diisocyanate, dicyclohexylmethane 2,2'-diisocyanate and hexamethylene 1,6-diisocyanate.

In a particularly preferred embodiment, the at least one polyisocyanate (PI) is a diphenylmethane 4,4'-diisocyanate (hereinafter referred as MDI). MDI is produced from aniline and formaldehyde feedstocks. Such methods are known to a person skilled in the art. The choice of MDI is not limited to any particular method for preparing the same. Accordingly, the person skilled in the art may obtain MDI by any suitable method. In fact, MDI may be commercially obtained such as, but not limited to, Lupranat® by BASF.

It is important to employ the correct stoichiometry in carrying out polymerization reaction, thereby leading to the thermoplastic polyurethane having the desired properties. Typically, the total number of isocyanate groups will be greater than or equal to the sum of active hydrogen-containing groups in the polymer. By the term "active hydrogen-containing groups", it is referred to the isocyanate-reactive groups or the hydroxyl groups of the at least one polyol composition (P) and the at least one low molecular weight diol (CE). This is expressed in terms of isocyanate index, which is usually greater than 1000. In other words, if the isocyanate index is greater than 1000, there is an excess of isocyanate groups. The isocyanate index in the context of the present invention is the stoichiometric ratio of isocyanate groups to the isocyanate-reactive groups, as described hereinabove.

For the purpose of the present invention, the at least one polyol composition (P), the at least one polyisocyanate (PI) and the at least one low molecular weight diol (CE) are added in such amounts that the isocyanate index is in the range of ≥900 to ≤1500. More preferably, it is in the range of ≥900 to ≤1300. Most preferably, it is in the range of ≥900 to ≤1100. In an embodiment, the isocyanate index is in the range of ≥950 to ≤1050.

Typically, the molar ratio between the at least one polyol composition (P) and the at least one polyisocyanate (PI) is in the range of ≥0.1:1 to ≤1:1 so that the resulting isocyanate index is in the range as prescribed hereinabove. Preferably, the weight ratio is in the range of ≥0.1:1 to ≤0.95:1, or ≥0.1:1 to ≤0.90:1, or ≥0.1:1 to ≤0.85:1, or ≥0.1:1 to ≤0.8:1, or ≥0.1:1 to ≤0.75:1. More preferably, the weight ratio is in the range of ≥0.1:1 to ≤0.7:1, or ≥0.1:1 to ≤0.65:1, or ≥0.1:1 to ≤0.6:1, or ≥0.1:1 to ≤0.55:1, or ≥0.1:1 to ≤0.5:1, or ≥0.1:1 to ≤0.45:1. Most preferably in the range of ≥0.15:1 to ≤0.45:1. In an embodiment, the molar ratio between the at least one polyol composition (P) and the at least one polyisocyanate (PI) is in the range of ≥0.15:1 to ≤0.4:1.

According to a further embodiment, the present invention therefore is also directed to the method as disclosed above, characterized in that in step (B) the molar ratio between the at least one polyol composition (P) and the at least one polyisocyanate (PI) is in the range of ≥0.1:1 to ≤1:1.

In step (B) of the method described hereinabove, at least one low molecular weight diol (CE) is also present and generally functions as a chain extender thereby for example serving as a spacer between the neighbouring isocyanates. By the term "low molecular weight", it refers to diols having a molecular weight in the range of ≥50 g/mol to ≤350 g/mol. The chain extender structure has a significant effect on the TPU properties because of its ability to drive phase separation, to complement or interfere with a regular hard segment structure and to promote inter-hard segment hydrogen bonding.

The chain extenders are generally low molecular weight diol or diamine stringing together the isocyanate. These are preferably selected from the group of di- and/or tri-functional alcohols, di- to tetra-functional polyoxyalkylene polyols and of alkyl-substituted aromatic diamines, or of mixtures of two or more of the recited extenders.

For the purpose of the present invention, the at least one low molecular weight diol (CE) has a molecular weight in the range of ≥50 g/mol to ≤350 g/mol, as described hereinabove. Preferably, the at least one low molecular weight diol (CE) has a molecular weight in the range of ≥60 g/mol to ≤350 g/mol. More preferably, the molecular weight is in the range of ≥60 g/mol to ≤330 g/mol, even more preferably in the range of ≥60 g/mol to ≤310 g/mol, or ≥60 g/mol to ≤310 g/mol, or ≥60 g/mol to ≤290 g/mol, or ≥60 g/mol to ≤290 g/mol, or ≥60 g/mol to ≤270 g/mol. Most preferably, the molecular weight is in the range of ≥70 g/mol to ≤270 g/mol, or ≥70 g/mol to ≤250 g/mol, or ≥70 g/mol to ≤250 g/mol, or ≥70 g/mol to ≤230 g/mol, or ≥70 g/mol to ≤230 g/mol, ≥70 g/mol to ≤210 g/mol. Even most preferably, the molecular weight is in the range of ≥70 g/mol to ≤190 g/mol, or ≥70 g/mol to ≤170 g/mol, or ≥70 g/mol to ≤150 g/mol. In a particularly preferable embodiment, the at least one low molecular weight diol (CE) has a molecular weight in the range of ≥80 g/mol to ≤130 g/mol.

The at least one low molecular weight diol (CE) as chain extenders are preferably $C_2$ to $C_{12}$ alkane diols, or $C_2$ to $C_6$ alkane diols. More preferably, ethanediol, 1,3-propanediol, 1,5-pentanediol, 1,6-hexanediol, 1,7-heptanediol, 1,8-octanediol, 1,9-nonanediol, 1,10-decanediol and preferably 1,4-butanediol. Preferred chain extending and/or crosslinking agents further include dialkylene glycols having 4 to 8 carbon atoms, preferably diethylene glycol and dipropylene glycol and/or di-, tri- or tetrafunctional polyoxyalkylene polyols.

The at least one low molecular weight diol (CE) may further include branched and/or unsaturated alkanediols having preferably not more than 12 carbon atoms, preferably 1,2-propanediol, 2 methylpropanediol-1,3,2,2-dimethylpropanediol-1,3, 2-butyl-2-ethylpropanediol-1,3, butene-2 diol-1,4 and butyne-2-diol-1,4, diesters of terephthalic acid with glycols of 2 to 4 carbon atoms, preferably terephthalic acid bis-ethylene glycol-1,4 or -butanediol-1,4, hydroxyalkylene ethers of hydroquinone or of resorcinol, preferably 1,4-di(β-hydroxyethyl)hydroquinone or 1,3 di(β-hydroxyethyl)resorcinol, alkanolamines having 2 to 12 carbon atoms, preferably ethanolamine, 2-aminopropanol and 3-amino-2,2-dimethylpropanol, N-alkyldialkanolamines, e.g., N-methyl- and N-ethyldiethanolamine.

To obtain specific mechanical properties, the alkyl-substituted aromatic polyamines are preferably also used in admixture with the aforementioned low molecular weight polyhydric alcohols, preferably di- and/or tri-hydric alcohols or dialkylene glycols.

In an embodiment, the at least one low molecular weight diol (CE) is selected from the group consisting of ethylene glycol, diethylene glycol, triethylene glycol, 1,3-propanediol, 1,4-butanediol, 1,5-pentanediol, 1,6-hexanediol, hydroquinone bis 2-hydroxyethyl ether and bis-2(hydroxy ethyl)-terephthalate.

According to a further embodiment, the present invention therefore is also directed to the method as disclosed above, characterized in that in step (B) the at least one low molecular weight diol (CE) is selected from the group consisting of ethylene glycol, diethylene glycol, triethylene glycol, 1,3-propanediol, 1,4-butanediol, 1,5-pentanediol, 1,6-hexanediol, hydroquinone bis 2-hydroxyethyl ether and bis-2(hydroxy ethyl)-terephthalate.

The weight ratio between the at least one polyol composition (P) and the at least one low molecular weight diol (CE) is in the range of $\geq 1:1$ to $\leq 15:1$. Preferably, the ratio is in the range of $\geq 1.4:1$ to $\leq 15:1$, or $\geq 1.4:1$ to $\leq 14.8:1$, or $\geq 1.8:1$ to $\leq 14.6:1$, or $\geq 1.8:1$ to $\leq 14.6:1$, or $\geq 2:1$ to $\leq 14.4:1$, or $\geq 2:1$ to $\leq 14.2:1$, or $\geq 2.4:1$ to $\leq 14.2:1$, or $\geq 2.4:1$ to $\leq 14:1$. More preferably, the ratio is in the range of $\geq 2.8:1$ to $\leq 14:1$, or $\geq 2.8:1$ to $\leq 13.8:1$, or $\geq 3:1$ to $\leq 13.8:1$, or $\geq 3:1$ to $\leq 13.6:1$, or $\geq 3.4:1$ to $\leq 13.6:1$, or $\geq 3.4:1$ to $\leq 13.4:1$, or $\geq 3.8:1$ to $\leq 13.4:1$, or $\geq 3.8:1$ to $\leq 13.2:1$, or $\geq 4:1$ to $\leq 13.2:1$, or $\geq 4:1$ to $\leq 13:1$. Most preferably, the ratio is in the range of $\geq 4.4:1$ to $\leq 13:1$, or $\geq 4.4:1$ to $\leq 12.8:1$, or $\geq 4.8:1$ to $\leq 12.8:1$, or $\geq 4.8:1$ to $\leq 12.6:1$, or $\geq 5:1$ to $\leq 12.6:1$, or $\geq 5:1$ to $\leq 12.4:1$, or $\geq 5:1$ to $\leq 12.2:1$. In an embodiment, weight ratio between the at least one polyol composition (P) and the at least one low molecular weight diol (CE) is in the range of $\geq 5:1$ to $\leq 12:1$.

For the purpose of the present invention, the at least one catalyst (CA) may be optionally added in step (B) of the method, as described hereinabove. The at least one catalyst (CA) is preferably an organometallic compound, such as a tin(II) salt of an organic carboxylic acid, preferably tin(II) dioctoate, tin(II) dilaurate, dibutyltin diacetate or dibutyltin dilaurate, while other organometallic compounds are bismuth salts, preferably bismuth(III) neodecanoate, bismuth 2-ethylhexanoate and bismuth octanoate, or the catalyst is a tertiary amine such as tetramethylethylenediamine, N-methylmorpholine, diethylbenzylamine, triethylamine, dimethylcyclohexyl-amine, diazabicyclooctane, N,N'-dimethylpiperazine, N methyl,N'-(4-N-dimethylamino)butylpiperazine, N,N,N',N",N"-pentamethyldiethylenediamine. Similar substances can also be used as catalysts.

Preferably, the at least one catalyst (CA) further includes amidines, preferably for example 2,3-dimethyl-3,4,5,6-tetrahydropyrimidine, tris(dialkylaminoalkyl)-s-hexahydrotriazines, in particular tris(N,N-dimethyl-aminopropyl)-s-hexahydrotriazine, tetraalkylammonium hydroxides, preferably for example tetramethylammonium hydroxide.

Preferred at least one catalyst (CA) further include N-methyl-N-dimethylaminoethylpiperazine and pentamethyldiethylenetriamine and also aromatic alkali metal carboxylates, alkali metal hydroxides, preferably for example sodium hydroxide, and alkali metal alkoxides, preferably for example sodium methoxide and potassium isopropoxide, and also alkali metal salts of long-chain fatty acids having 10 to 20 carbon atoms with or without OH side groups.

The at least one catalyst (CA) is preferably used in amounts from 0.0001 parts by weight to 0.1 parts by weight per 100 parts by weight based on the at least one polyol composition (P). The person skilled in the art is well aware of such at least one catalyst (CA) and the amount to be added to obtain TPU. The choice and selection of the at least one catalyst (CA) does not limit the method of the present invention described hereinabove.

The step (B) comprising the at least one additive (AD) is selected from the group consisting of antioxidant, hydrolysis stabilizer, light stabilizer, UV absorbers, blowing agents and other process stabilizers. The person skilled in the art is well aware of these additives and any further additives that may be added to obtain the thermoplastic polyurethane from the method as described hereinabove. For instance, commercially available additives such as, but not limited to, Citrofil® from Jungbunzlauer and Irganox® from BASF can be employed as the at least one additive (AD).

According to a further embodiment, the present invention therefore is also directed to the method as disclosed above, characterized in that in step (B) the at least one additive (AD) is selected from the group consisting of antioxidant, hydrolysis stabilizer, light stabilizer, UV absorbers, blowing agents and other process stabilizers.

Blowing agents are employable for example in the present invention. Commonly known chemically and/or physically acting compounds are yet additionally employable as blowing agents. Chemical blowing agents are compounds that react with isocyanate to form gaseous products. Physical blowing agents are compounds which are present in the TPU production ingredients in dissolved or emulsified form and vaporize under the conditions of TPU formation.

Suitable blowing agents for the purposes of the present invention include, for example, low-boiling liquids which vaporize under the influence of the exothermic polyaddition reaction. Liquids that are inert with regard to the organic polyisocyanate and have boiling points below 100° C. are particularly suitable. Examples of liquids of this type, which are preferably used, are halogenated, preferably fluorinated, hydrocarbons, e.g., methylene chloride and dichloromonofluoromethane, per or partially fluorinated hydrocarbons, e.g., trifluoromethane, difluoromethane, difluoroethane, tetrafluoroethane and heptafluoropropane, hydrocarbons, e.g., n-butane, iso-butane, n-pentane, isopentane and also the technical-grade mixtures thereof, propane, propylene, hexane, heptane, cyclobutane, cyclopentane and cyclohexane, dialkyl ethers, preferably, for example, dimethyl ether, diethyl ether and furan, carboxylic acids, for example, farmic acid, carboxylic esters, preferably, for example, methyl and ethyl formates, ketones, preferably, for example, acetone, and/or fluorinated and/or perfluorinated, tertiary alkylamines, preferably, for example, perfluoro-dimethylisopropylamine. Other blowing agents such as $CO_2$ and $N_2$ may also be employed for the purpose of the present invention.

It is similarly possible to use mixtures of these low-boiling liquids with one another and/or with other substituted or unsubstituted hydrocarbons. The best amount of blowing agent depends on the target density and also on the amount of the preferably co-used water. Satisfactory results are generally obtained with amounts in the range of $\geq 1$ wt.-% to $\leq 15$ wt.-%, preferably $\geq 2$ wt.-% to $\leq 11$ wt.-%, based on the at least one polyol composition (P).

A preferred embodiment employs a blowing agent comprising a mixture comprising one or more of these blowing agents and water, more preferably no physical blowing agents and yet more preferably water as sole blowing agent.

The water content in a preferred embodiment is in the range of $\geq 0.1$ wt.-% to $\leq 3$ wt.-%, preferably in the range of $\geq 0.4$ wt.-% to $\leq 2$ wt.-% and more preferably in the range of $\geq 0.6$ wt.-% to $\leq 1.5$ wt.-%, based on the at least one polyol composition (P).

Microbeads containing physical blowing agent may also be additionally admixed in the present invention. The microbeads are also employable in admixture with the aforementioned blowing agents.

The microbeads typically consist of a shell of thermoplastic polymer and are filled in the core with a liquid, low-boiling substance based on alkanes. The production of such microbeads is described for example in U.S. Pat. No. 3,615,972. The microbeads are generally from 5 to 50 µm in diameter. Examples of suitable microbeads are available as Expancell® from Akzo Nobel.

The microbeads are generally added in an amount in the range of ≥0.5 wt.-% to ≤5 wt.-%, based on the total weight of the at least one polyol composition (P).

Alternatively, supercritical fluids may be used along with the blowing agents, as described hereinabove and mixed with molten thermoplastic polyurethane of the present invention. Said mixture can then be subjected to injection molding techniques in a mold to obtain low density foamed TPU. The supercritical fluids can be selected from the group consisting of supercritical $CO_2$ and/or $N_2$. One such technique is described in US 2015/0038605 A1. Suitable techniques can also be employed in the present invention.

Other blowing agents are selected based on the method and the precise conditions and include, but are not limited to organic liquids or inorganic gases, or a mixture thereof. Liquids that can be used comprise halogenated hydrocarbons, or saturated, aliphatic hydrocarbons, in particular those having from 3 to 8 carbon atoms. Suitable inorganic gases are nitrogen, air, ammonia, or carbon dioxide, as described hereinabove. Further details can be found in, for e.g. WO2005/023920, WO2007/082838, WO2010/136398, WO2013/153190, WO2014/198779, WO2015/055811, WO2017/030835, US2017/0036377, US2016/0271847, US2016/0108198, WO2014/150119, WO2014/150124 and WO2016/131671.

Customary auxiliary substance materials and/or added substance materials are further employable. Auxiliary substance materials and/or added substance materials take the form of a single substance or of a mixture of two or more auxiliary substance materials and/or added substance materials. Examples include surface-active substances, fillers, flame retardants, nucleators, oxidation inhibitors, lubricating and demolding aids, dyes and pigments, optionally stabilizers, preferably against hydrolysis, light, heat or discoloration, organic and/or inorganic fillers, reinforcing agents and/or plasticizers.

Stabilizers for the purposes of the present invention are additives to protect a plastic or a mixture of plastics from harmful environmental influences. Examples are primary and secondary antioxidants, hindered amine light stabilizers, UV absorbers, hydrolysis control agents, quench-ers and flame retardants. Examples of commercial stabilizers are given in Plastics Additive Handbook, 5th Edition, H. Zweifel, ed., Hanser Publishers, Munich, 2001 ([1]), p. 98 to 136.

Useful surface-active substances include, for example, compounds to augment the homogenization of the starting materials and possibly also capable of acting as cell structure regulators. Examples include emulsifiers, e.g., the sodium salts of castor oil sulfates or of fatty acids, and also salts of fatty acids with amines, for example diethylamine oleate, diethanolamine stearate, diethanolamine ricinoleate, salts of sulfonic acids, e.g., alkali metal or ammonium salts of do-decylbenzene- or dinaphthylmethanedisulfonic acid and ricinoleic acid; foam stabilizers, such as siloxane-oxyalkylene interpolymers and other organosiloxanes, ethoxylated alkylphenols, ethoxylated fatty alcohols, paraffin oils, castor oil esters or, to be more precise, ricinoleic esters, Turkey red oil and peanut oil and cell regulators, such as paraffins, fatty alcohols and dimethylpolysiloxanes. To improve the emulsifying effect, the cell structure and/or stabilization it is further possible to use oligomeric polyacrylates having polyoxyalkylene and fluoroalkane moieties as side groups. Surface-active substances are typically used in amounts from 0.01 part by weight to 5 parts by weight, based on 100 parts by weight of the at least one polyol composition (P).

Fillers, especially reinforcing fillers, include the customary, familiar organic and inorganic fillers, reinforcing agents and weighting agents. Specific examples are inorganic fillers such as silicatic minerals, for example sheet-silicates such as antigorite, serpentine, hornblendes, amphibols, chrisotile, talc; metal oxides, such as kaolin, aluminum oxides, aluminum silicate, titanium oxides and iron oxides, metal salts such as chalk, barite and inorganic pigments, such as cadmium sulfide, zinc sulfide and also glass particles. Useful organic fillers include for example carbon black, melamine, expandable graphite, rosin, cyclopentadienyl resins, graft polyols and graft polymers.

By way of reinforcing fillers, it is preferable to use fibers, for example carbon fibers or glass fibers, particularly when a high level of heat resistance or very high stiffness is demanded, in which case the fibers may be endowed with adhesion promoters and/or sizers.

Organic and inorganic fillers may be used singly or as mixtures, and are typically added to the reaction mixture in an amount in the range of ≥0.5 wt.-% to ≤50 wt.-%, preferably ≥1 wt.-% to ≤30 wt.-% based on the weight of the at least one polyol composition (P) and the at least one polyisocyanate (PI).

Suitable flame retardants include, for example, tricresyl phosphate, tris(2-chloroethyl) phosphate, tris(2-chloropropyl) phosphate, tris(1,3-dichloropropyl) phosphate, tris(2,3-dibromo¬propyl) phosphate and tetrakis(2-chloroethyl) ethylene diphosphate.

Aside from the aforementioned halogen-substituted phosphates, it is also possible to use inorganic flame retardants such as red phosphorus, aluminum oxide hydrate, antimony trioxide, arsenic trioxide, ammonium polyphosphate and calcium sulfate or cyanuric acid derivatives, e.g., melamine, or mixtures of two or more flame retardants, e.g., ammonium phosphates and melamine, and also optionally starch and/or expandable graphite to confer flame retardancy on the TPU prepared according to the present invention.

As nucleators there may be used, for example, talc, calcium fluoride, sodium phenyl-phosphinate, aluminum oxide and finely divided polytetrafluoroethylene in amounts up to 5 wt.-%, based on the total weight of the at least one polyol composition (P) and the at least one polyisocyanate (PI), as described hereinabove.

Suitable oxidation retarders and heat stabilizers may be also added to the method of the present invention. These include, for example, halides of metals of group I of the periodic table, e.g., sodium halides, potassium halides, lithium halides, optionally combined with copper(I) halides, e.g., chlorides, bromides or iodides, sterically hindered phenols, hydroquinones, and also substituted compounds of these groups and mixtures thereof, which are preferably used in concentrations up to 1 wt.-% based on the weight of the at least one polyol composition (P) and of the at least one polyisocyanate (PI).

Examples of hydrolysis control agents which may be added to in the method, as described hereinabove, are various substituted carbodiimides, such as preferably 2,2', 6,6'-tetraisopropyldiphenylcarbodiimide or carbodiimides based on 1,3-bis(1-methyl-1 isocyanatoethyl)benzene as described for example in the documents DE 19821668 A1, U.S. Pat. No. 6,184,410, DE 10004328 A1, U.S. Pat. No. 6,730,807, EP 0940389 B1 or U.S. Pat. No. 5,498,747, which are generally used in amounts up to 4.0 wt.-%, preferably in the range of ≥1.5 wt.-% to ≤2.5 wt.-% based on the weight of the at least one polyol composition (P) and of the at least one polyisocyanate (PI).

Lubricating and demolding agents, generally likewise added in amounts up to 1 wt.-%, based on the weight of the at least one polyol composition (P) and of the at least one polyisocyanate (PI), are stearic acid, stearyl alcohol, stearic esters and amides and also the fatty acid esters of pentaerythritol.

It is further possible to add organic dyes, such as nigrosine, pigments, e.g., titanium dioxide, cadmium sulfide, cadmium sulfide selenide, phthalocyanines, ultramarine blue or carbon black.

Further particulars of the abovementioned auxiliary and added-substance materials are found in the trade literature, for example in Plastics Additive Handbook, 5th edition, H. Zweifel, ed, Hanser Publishers, Munich, 2001, p. 98-136.

The at least one additive (AD) as described hereinabove, if present, may be in any suitable amount known to the person skilled in the art. For instance, the at least one additive (AD) may be in an amount in the range of ≥0.1 wt.-% to ≤60 wt.-% based on the total weight of the thermoplastic polyurethane.

According to a further aspect, the present invention therefore is also directed to a thermoplastic polyurethane obtained or obtainable by the method of the present invention as disclosed above.

In an aspect of the present invention, a thermoplastic polyurethane as obtained by the method, as described hereinabove, has a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode and a hard segment fraction in the range of ≥0.1 to ≤0.7. The hard segment fraction being defined by the formula:

$$\text{Hard segment fraction} = \left\{ \sum_{x=1}^{k} [(m_{KV,CE}/M_{KV,CE}) * M_{Iso} + m_{KV,CE}] \right\} / m_{total}$$

wherein,
$m_{KV,CE}$ is the mass of the at least one low molecular weight diol (CE) in g,
$M_{KV,CE}$ is the molar mass of the at least one low molecular weight diol (CE) in g/mol,
$M_{Iso}$ is the molar mass of the at least one polyisocyanate (PI) in g/mol,
$m_{total}$ is the total mass of all the starting materials in g,
k is the number of the at least one low molecular weight diol (CE).

By the term "number" in the definition of 'k' in the above formula, it is referred to the number of units of the said at least one low molecular weight diol (CE).

For the purpose of the present invention, the term "$m_{total}$" as used hereinabove in the formula for calculating the hard segment fraction and representing the total mass of all the starting materials in g, comprises the at least one polyol composition (P), the at least one polyisocyanate (PI), the at least one low molecular weight diol (CE), optionally the at least one additive (AD) and/or the at least one catalyst (CA), as described hereinabove.

Preferably, the thermoplastic polyurethane has the hard segment fraction in the range of ≥0.15 to ≤0.70. More preferably the hard segment fraction is in the range of ≥0.20 to ≤0.70. Most preferably, the hard segment fraction is in the range of ≥0.20 to ≤0.60. In an embodiment, the hard segment fraction of the thermoplastic polyurethane obtained according to the method as described hereinabove is in the range of ≥0.20 to ≤0.50.

Preferably, the $T_g$ of the thermoplastic polyurethane is in the range of ≥−60° C. to ≤10° C. determined by dynamic mechanical thermal analysis according to DIN EN ISO 6721-1:2011-08 at a heating rate of 2 K/min and 1 Hz torsion mode. More preferably, the $T_g$ is in the range of ≥−60° C. to ≤5° C. determined by dynamic mechanical thermal analysis according to DIN EN ISO 6721-1:2011-08 at a heating rate of 2 K/min and 1 Hz torsion mode. Most preferably, the $T_g$ is in the range of ≥−60° C. to ≤0° C. determined by dynamic mechanical thermal analysis according to DIN EN ISO 6721-1:2011-08 at a heating rate of 2 K/min and 1 Hz torsion mode.

For the purpose of the present invention, the $T_g$ of the thermoplastic polyurethane is determined by dynamic mechanical thermal analysis, as described hereinabove. Dynamic mechanical thermal analysis or dynamic mechanical analysis yields information about the mechanical properties of a specimen placed in minor, usually sinusoidal, oscillation of a function of time and temperature by subjecting it to a small, usually sinusoidal, oscillating force. In order to measure the $T_g$ value of the TPU, storage modulus (G') and loss modulus (G") are first determined. The storage modulus (G') represents the stiffness of the polymer material and is proportional to the energy stored during a loading cycle. The loss modulus (G") is defined as being proportional to the energy dissipated during one loading cycle. It represents, for example, energy lost as heat, and is a measure of vibrational energy that has been converted during vibration and that cannot be recovered. Next, phase angle delta (δ) is measured which is the phase difference between dynamic stress and dynamic strain in the TPU subjected to a sinusoidal oscillation. Loss factor tan delta is the ratio of loss modulus (G') to storage modulus (G"). It is a measure of the energy lost, expressed in terms of the recoverable energy, and represents mechanical damping or internal friction in the TPU. A high tan delta value is indicative of a material that has a high, non-elastic strain component, while a low value indicates one that is more elastic. Often, the $T_g$ value is taken to be the temperature of the maximum loss modulus ($G''_{max}$) or the maximum loss factor (max tan delta), as shown in the examples described hereinbelow.

The thermoplastic polyurethane, as described hereinabove, preferably has a durometer Shore A hardness in the range of ≥20 to ≤100 determined according to ASTM D2240:2015. Preferably, it is in the range of ≥40 to ≤90, more preferably in the range of ≥65 to ≤90, most preferably in the range of ≥70 to ≤90 determined according to ASTM D2240:2015.

Shore D hardness of the thermoplastic polyurethane preferably is in the range of ≥30 to ≤90 determined according to ASTM D2240:2015. Preferably, it is in the range of ≥50 to ≤90, more preferably in the range of ≥60 to ≤90, most preferably in the range of ≥65 to ≤85 determined according to ASTM D2240:2015.

The density of the thermoplastic polyurethane, as obtained according to the method described hereinabove, may vary depending on the components present therein and the expansion of the TPU itself. Nevertheless, the thermoplastic polyurethane preferably has a DIN EN ISO 845: 2009-10 density in the range of ≥800 kg/m³ to ≤1500 kg/m³. Preferably, the density is in the range of ≥900 kg/m³ to ≤1500 kg/m³. More preferably, the density is in the range of ≥1000 kg/m³ to ≤1500 kg/m³. Most preferably, the density is in the range of ≥1000 kg/m³ to ≤1400 kg/m³. In a particularly preferred embodiment, the density is in the range of ≥1000 kg/m³ to ≤1300 kg/m³ as determined according to DIN EN ISO 845:2009-10.

According to a further aspect, the present invention therefore is also directed to a use of the thermoplastic polyurethane as disclosed above or the thermoplastic polyurethane obtained by the method as disclosed above in extruded article and injection molded article.

The ability of the present invention thermoplastic polyurethane to withstand low temperatures, such as those in the vicinity of its $T_g$, as described hereinabove, along with improved mechanical properties of abrasion resistance, tensile strength, elongation at break, tear propagation at strength and compression set without any soft phase crystallization for example enables it to be used as part of a shoe or of a shoe sole, for example part of an insert sole or of a midsole, sealants, profiles and other similar applications.

Thus, the present invention therefore is also directed to the use of the thermoplastic polyurethane as described above for the production of filling material for mattresses, parts of mattresses, mattresses as such, filling of tires, tires or part of tires, shoes, shoe-soles, shoe-midsoles gymnastic mats, protective clothing, cushioning elements for automotive, sound absorbers, anti-vibration devices, cushioning elements for bicycle saddles, toys, flooring or packaging materials.

The thermoplastic polyurethane shoe soles of the present invention are preferably employed as a midsole, for example for footwear, sport shoes, sandals and boots. More particularly, the polyurethane shoe soles of the present invention are used as midsole for shoes. A shoe sole according to the present invention further also comprises shoe sole parts, for example heel parts or ball parts. Shoe soles of the present invention can also be used as insert soles or combi-soles.

The present invention TPU, as described hereinabove, can be further used in, such as but not limited to, cable shielding, tubes, films, O-rings, sealings, conveyor belts, damping elements, laser or heat sintering techniques, stereo lithography, fused deposition modelling and slush molding. Additionally, it can also be used in making railway parts, pneumatic and non-pneumatic tires, bicycle seats, protection parts and tire parts.

Another aspect of the present invention describes use of the thermoplastic polyurethane, as described hereinabove or as obtained according to the method also described hereinabove, in extruded article and injection molded article. The present invention therefore is also directed to the use of the thermoplastic polyurethane as described above in extruded articles or injection molded articles.

By the term "extruded article", it is referred to the articles obtained after extrusion of the thermoplastic polyurethane, as described hereinabove, in a suitable die or mould. Similarly, the term "injection molded article" refers to the articles obtained after injection molding of the thermoplastic polyurethane, as described hereinabove, in a suitable die or mould. Articles of any desired shape, size and dimension may be obtained using the present invention thermoplastic polyurethane, as described hereinabove, and with suitable techniques known to the person skilled in the art. Accordingly, the present invention is not limited by the choice of such article and/or the mould or die for obtaining the said article.

As is known to those skilled in the art, injection molding is a cyclic process while extrusion is a steady-state process. Extruded products or articles are long and continuous and have a cross section that is usually constant with respect to the axis or direction of production. Injection molded products or articles, on the other hand, are discrete item with varying cross sections in each axis. The thermoplastic polyurethane of the present invention can be employed to obtain articles for a wide range of application, such as but not limited to, low temperature applications. By the term "low temperature", it is referred to the temperature in the vicinity of the $T_g$ of the thermoplastic polyurethane, as described hereinabove. Moreover, the low $T_g$ of the thermoplastic polyurethane reduces the dynamic stiffening and heat build-up in applications where vibration plays a role. The absence of any soft phase crystallization further opens up a wide application area for the TPU.

A person skilled in the art is well aware of the techniques involved in extrusion and injection molding. Accordingly, the use of the present invention thermoplastic polyurethane in extruded article and injection molded article is neither limited by the technique chosen by the skilled person and nor the mold or its type employed therefor.

The present invention also relates to expanded thermoplastic polyurethane particles based on thermoplastic polyurethane as described herein as well as particle foams and methods to produce expanded thermoplastic polyurethane particles and particle foams based on expanded thermoplastic polyurethane particles.

Thus, an aspect of the present invention relates to a method for producing expanded thermoplastic polyurethane particles, comprising:
(a) melting the thermoplastic polyurethane, as described hereinabove, to obtain a melt,
(b) mixing a blowing agent with the melt obtained in step (a), and
(c) producing expanded thermoplastic polyurethane particles from the resulting melt.

According to a further embodiment, the present invention therefore is also directed to a method for producing expanded thermoplastic polyurethane particles, comprising:
(a) melting the thermoplastic polyurethane as disclosed above or the thermoplastic polyurethane obtained by the method as disclosed above to obtain a melt,
(b) mixing a blowing agent with the melt obtained in step (a), and
(c) producing expanded thermoplastic polyurethane particles from the resulting melt.

Details of the methods to produce expanded thermoplastic polyurethane particles (or E-TPU particles) based on thermoplastic polyurethane, suitable blowing agents and further required auxiliaries are well-known to the person skilled in the art. For instance, the following procedures may be employed:
a. impregnating particles of the thermoplastic polyurethane as described hereinabove (obtainable e.g. by extrusion) with average, minimal diameter from 0.2 mm to 10 mm determined by 3D evaluation of granules (e.g. by dynamic image analysis using a PartAn 3D, Microtrac) under pressure at a temperature in the range of ≥100° C. to ≤200° C. with blowing agents (e.g. in a supercritical fluid as blowing agent or in suspension with blowing agent) optionally further auxiliaries (e.g. suspension agents) followed by depressurizing; or b. by melting the thermoplastic polyurethane as described hereinabove, if appropriate with additives together with blowing agents (e.g. in the range of ≥0.1 wt.-% to ≤60 wt.-% based on the total weight of thermoplastic polyurethane) at elevated temperatures and under pressure in an extruder and pelletizing the melt without devices which inhibit uncontrolled foaming (e.g. by underwater granulation).

Further details of these methods can be found in, for e.g. WO2005/023920, WO2007/082838, WO2010/136398, WO2013/153190, WO2014/198779, WO2015/055811 WO2017/030835, US2017/0036377, US2016/0271847, US2016/0108198, WO2014/150119, WO2014/150124 and WO2016/131671.

Suitable blowing agents are selected based on the method and the precise conditions and include, but are not limited to organic liquids or inorganic gases, or a mixture thereof. Liquids that can be used comprise halogenated hydrocarbons, or saturated, aliphatic hydrocarbons, in particular those having from 3 to 8 carbon atoms. Suitable inorganic gases are nitrogen, air, ammonia, or carbon dioxide. Further details can be found in, for e.g. WO2005/023920, WO2007/082838, WO2010/136398, WO2013/153190, WO2014/198779, WO2015/055811 WO2017/030835, US2017/0036377, US2016/0271847, US2016/0108198, WO2014/150119, WO2014/150124 and WO2016/131671.

A further aspect of the present invention relates to particle foams based on the expanded thermoplastic polyurethane particles as described hereinabove. Such particle foams are obtainable by fusing the expanded thermoplastic polyurethane particles, for e.g. by steam at a temperature in the range of ≥100° C. to ≤200° C., optionally at pressure in the range of ≥0.1 bar to ≤6 bar for temperature up to 150° C. For temperature in the range of ≥150° C. to ≤200° C., pressure up to 20 bar can be used, with the proviso that the temperature used for fusing is higher than the temperature of impregnation (e.g. in process variant "a.", as described hereinabove) or by high energy radiation (e.g. microwave radiation for radiowave radiation).

The resulting particle foam generally comprises fused expanded thermoplastic polyurethane particles with open cell to closed cell structure, preferably a closed cell structure with densities in the range of ≥50 kg/m$^3$ to ≤300 kg/m$^3$, preferably 80 kg/m$^3$ to ≤150 kg/m$^3$.

In yet another aspect, the present invention relates to use of the expanded thermoplastic particles, as described hereinabove, or the particle foams, also described hereinabove, for the production of filling material for mattresses, parts of mattresses, mattresses as such, filling of tires, tires or part of tires, shoes, shoe-soles, shoe-midsoles gymnastic mats, protective clothing, cushioning elements for automotive, sound absorbers, anti-vibration devices e.g. for suspension fork absorbers, cushioning elements for bicycle saddles, toys, flooring, e.g. sport floorings or footpath surfacing or under- or interlayer of footpath or packaging materials The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time inter-val coherence between the steps, that is, the steps may be carried out simultaneously or there may be time intervals of seconds, minutes, hours, days, weeks, months or even years between such steps, unless otherwise indicated in the application as set forth herein above or below.

Preferably, the terms "first", "second", "third" or "(a)", "(b)", "(c)", "(d)" etc. and the like in the description and in the claims, are used for describing a sequential or chronological order in the context of the present invention.

In the specification, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The present invention is illustrated in more detail by the following embodiments and combinations of embodiments which result from the corresponding dependency references and links. The present invention is further illustrated by the following embodiments and combinations of embodiments as indicated by the respective dependencies and back-references. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A method for preparing a thermoplastic polyurethane, comprising the steps of:
   (A) providing at least one polyol composition (P) comprising
      (P1) a poly-ε-caprolactone polyol,
   (B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode, wherein the at least one polyol composition (P) has a number average molecular weight Mn in the range of ≥1500 g/mol to ≤10,000 g/mol determined according to DIN55672-1:2016-03, and wherein the at least one low molecular weight diol (CE) has a molecular weight in the range of ≥50 g/mol to ≤350 g/mol.

2. The method according to embodiment 1, characterized in that in step (A) the poly-ε-caprolactone polyol (P1) has a number average molecular weight Mn in the range of ≥1500 g/mol to ≤4000 g/mol determined according to DIN 55672-1: 2016-03.

3. The method according to embodiment 1 or 2, characterized in that in step (A) the poly-ε-caprolactone polyol (P1) is obtained by reacting ε-caprolactone (PI1) and a starter molecule (P12) having a number average molecular weight in the range of ≥80 g/mol to ≤1500 g/mol as determined according to DIN 55672-1: 2016-03.

4. The method according to embodiment 3, characterized in that the starter molecule (P12) in the poly-ε-caprolactone polyol (P1) in step (A) is selected from the group consisting of neopentyl glycol, 1,4-butanediol, 1,6-hexanediol, polyethylene glycol, polypropylene glycol, α-hydro-ω-hydroxypoly(oxytetra-methylene) diol and α-hydro-ω-hydroxypoly(oxytri-methylene) diol.

5. The method according to embodiment 3 or 4, characterized in that the starter molecule (P12) in the poly-ε-caprolactone polyol (P1) in step (A) is α-hydro-ω-hydroxypoly(oxytetra-methylene) diol.

6. The method according to one or more of embodiments 1 to 5, characterized in that the poly-ε-caprolactone polyol (P1) in step (A) has a weight ratio between the ε-caprolactone (P11) and the starting molecule (P12) in the range of ≥1:10 to ≤10:1.

7. The method according to one or more of embodiments 1 to 6, characterized in that in step (A) the at least one polyol composition (P) further comprises a second polyol (P2) which is different from poly-ε-caprolactone polyol (P1).

8. The method according to embodiment 7, characterized in that the second polyol (P2) is selected from the group consisting of a polyether polyol (P21), polyester polyol (P22) and polycarbonate polyol (P23).

9. The method according to embodiment 7 or 8, characterized in that the second polyol (P2) is a polyether polyol (P21).

10. The method according to embodiment 9, characterized in that the polyether polyol (P21) is α-hydro-ω-hydroxypoly(oxytetra-methylene) diol.

11. The method according to one or more of embodiments 7 to 10, characterized in that the second polyol (P2) has a number average molecular weight Mn in the range of ≥1000 g/mol to ≤4000 g/mol determined according to DIN 55672-1: 2016-03.

12. The method according to one or more of embodiments 7 to 11, characterized in that the weight ratio between the poly-ε-caprolactone polyol (P1) and the second polyol (P2) is in the range of ≥1:5 to ≤10:1.

13. The method according to one or more of embodiments 1 to 12, characterized in that in step (B) a temperature in the range of ≥70° C. to ≤120° C. is provided.

14. The method according to one or more of embodiments 1 to 13, characterized in that in step (B) the at least one polyisocyanate (PI) is selected from the group consisting of 2,2'-, 2,4'- and 4,4'-diphenylmethane diisocyanate, 2,4- and 2,6-toluene diisocyanate, 1,2-, 1,3- and 1,4-cyclohexane diisocyanates, hexamethylene 1,6-diisocyanate, 2-methyl-1,5-pentamethylene diisocyanate, pentamethylene 1,5-diisocyanate, tetramethylene 1,4-diisocyanate, isophorone diisocyanate, p-phenyl diisocyanate, o-tolidine diisocyanate and 1,5-naphthalene diisocyanate and 4,4'-Diisocyanatdicyclohexylmethane.

15. The method according to embodiment 14, characterized in that the at least one polyisocyanate (PI) is 4,4'-diphenylmethane diisocyanate.

16. The method according to one or more of embodiments 1 to 15, characterized in that in step (B) the at least one low molecular weight diol (CE) is selected from the group consisting of ethylene glycol, diethylene glycol, triethylene glycol, 1,3-propanediol, 1,4-butanediol, 1,5-pentanediol, 1,6-hexanediol, hydroquinone bis 2-hydroxyethyl ether and bis-2(hydroxy ethyl)-terephthalate.

17. The method according to one or more of embodiments 1 to 16, characterized in that in step (B) the at least one additive (AD) is selected from the group consisting of antioxidant, hydrolysis stabilizer, light stabilizer, UV absorbers, blowing agents and other process stabilizers.

18. The method according to one or more of embodiments 1 to 17, characterized in that in step (A) the at least one polyol composition has an OH value in the range of ≥10 mg KOH/g to ≤100 mg KOH/g determined according to DIN 53240-3:2016-03.

19. The method according to one or more of embodiments 1 to 18, characterized in that in step (B) the molar ratio between the at least one polyol composition (P) and the at least one polyisocyanate (PI) is in the range of ≥0.1:1 to ≤1:1.

20. The method according to one or more of embodiments 1 to 19, characterized in that in step (B) the weight ratio between the at least one polyisocyanate (P) and the at least one low molecular weight diol (CE) is in the range of ≥1:1 to ≤15:1.

21. The method according to one or more of embodiments 1 to 20, characterized in that in step (B) the at least one polyol composition (P), the at least one polyisocyanate (PI) and the at least one chain extender are reacted simultaneously.

22. The method according to one or more of embodiments 1 to 21, characterized in that the at least one low molecular weight diol (CE) has a molecular weight in the range of ≥50 to ≤250 g/mol.

23. A thermoplastic polyurethane obtained by the method according to one or more of embodiments 1 to 22, characterized in that the thermoplastic polyurethane has a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode and a hard segment fraction in the range of ≥0.1 to ≤0.7, the hard segment fraction being defined by the formula:

$$\text{Hard segment fraction} = \left\{ \sum_{x=1}^{k} [(m_{KV,CE}/M_{KV,CE}) * M_{Iso} + m_{KV,CE}] \right\} / m_{total}$$

wherein, $m_{KV,CE}$ is the mass of the at least one low molecular weight diol (CE) in g, $M_{KV,CE}$ is the molar mass of the at least one low molecular weight diol (CE) in g/mol, $M_{Iso}$ is the molar mass of the at least one polyisocyanate (PI) in g/mol, $m_{total}$ is the total mass of all the starting materials in g, k is the number of the at least one low molecular weight diol (CE).

24. Use of the thermoplastic polyurethane according to embodiment 23 or the thermoplastic polyurethane obtained by the method according to one or more of embodiments 1 to 22 in extruded article and injection molded article.

25. A method for producing expanded thermoplastic polyurethane particles, comprising:
    (a) melting the thermoplastic polyurethane according to embodiment 23 or the thermoplastic polyurethane obtained by the method according to one or more of embodiments 1 to 22 to obtain a melt,
    (b) mixing a blowing agent with the melt obtained in step (a), and
    (c) producing expanded thermoplastic polyurethane particles from the resulting melt.

26. Expanded thermoplastic polyurethane particles obtained by the method according to embodiment 25.

27. A particle foam based on expanded thermoplastic polyurethane particles according to embodiment 26.

28. Use of the expanded thermoplastic polyurethane particles according to embodiment 26 or the particle foam according to embodiment 27 for the production of filling material for mattresses, parts of mattresses, mattresses as such, filling of tires, tires or part of tires, shoes, shoe-soles, shoe-midsoles gymnastic mats, protective clothing, cushioning elements for automotive, sound absorbers, anti-vibration devices, cushioning elements for bicycle saddles, toys, flooring or packaging materials.

29. A method for preparing a thermoplastic polyurethane, comprising the steps of:
    (A) providing at least one polyol composition (P) comprising
        (P1) a poly-ε-caprolactone polyol, and
        (P2) a second polyol (P2) which is different from the first polyol (P1),
    (B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane,
    wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

30. The method according to embodiment 29, wherein the thermoplastic polyurethane has a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode.

31. A method for preparing a thermoplastic polyurethane, comprising the steps of:
    (A) providing at least one polyol composition (P) comprising
        (P1) a poly-ε-caprolactone polyol, and
        (P2) a second polyol (P2) which is different from the first polyol (P1),
    (B) reacting the at least one polyol composition (P) of step (A) with at least one polyisocyanate (PI) and at least one low molecular weight diol (CE) optionally in the presence of at least one catalyst (CA) and/or at least one additive (AD) to obtain a thermoplastic polyurethane having a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode,
    wherein the at least one polyol composition (P) has a number average molecular weight Mn in the range of ≥1500 g/mol to ≤10,000 g/mol determined according to DIN 55672-1: 2016-03, and wherein the at least one low molecular weight diol (CE) has a molecular weight in the range of ≥50 g/mol to ≤350 g/mol.

32. The method according to any of embodiments 29 to 31, characterized in that the weight ratio between the poly-ε-caprolactone polyol (P1) and the second polyol (P2) in the polyol composition (P) is in the range of ≥1:5 to ≤10:1.

33. The method according to any of embodiments 29 to 32, characterized in that the polyol (P1) has a number average molecular weight in the range of ≥1500 g/mol to ≤2500 g/mol determined according to DIN 55672-1: 2016-03.

34. The method according to any of embodiments 29 to 33, characterized in that the second polyol (P2) has a number average molecular weight Mn in the range of ≥1000 g/mol to ≤4000 g/mol determined according to DIN 55672-1: 2016-03.

35. The method according to any of embodiments 29 to 34, characterized in that in step (A) the poly-ε-caprolactone polyol (P1) is obtained by reacting ε-caprolactone (P11) and a starter molecule (P12) having a number average molecular weight in the range of ≥80 g/mol to ≤1500 g/mol as determined according to DIN 55672-1: 2016-03.

36. The method according to any of embodiments 29 to 35, characterized in that the starter molecule (P12) in the poly-ε-caprolactone polyol (P1) in step (A) is selected from the group consisting of neopentyl glycol, 1,4-butanediol, 1,6-hexanediol, polyethylene glycol, polypropylene glycol, α-hydro-ω-hydroxypoly (oxytetra-methylene) diol and α-hydro-ω-hydroxypoly (oxytri-methylene) diol.

37. The method according to one or more of embodiments 29 to 36, characterized in that the poly-ε-caprolactone polyol (P1) in step (A) has a weight ratio between the ε-caprolactone (P11) and the starting molecule (P12) in the range of ≥1:10 to ≤10:1.

38. The method according to any one of embodiments 29 to 37, characterized in that the second polyol (P2) is selected from the group consisting of a polyether polyol (P21), polyester polyol (P22) and polycarbonate polyol (P23).

39. The method according to one or more of embodiments 29 to 38, characterized in that in step (B) the at least one polyisocyanate (PI) is selected from the group consisting of 2,2'-, 2,4'- and 4,4'-diphenylmethane diisocyanate, 2,4- and 2,6-toluene diisocyanate, 1,2-, 1,3- and 1,4-cyclohexane diisocyanates, hexamethylene 1,6-diisocyanate, 2-methyl-1,5-pentamethylene diisocyanate, pentamethylene 1,5-diisocyanate, tetramethylene 1,4-diisocyanate, isophorone diisocyanate, p-phenyl diisocyanate, o-tolidine diisocyanate and 1,5-naphthalene diisocyanate and 4,4'-diisocyanatdicyclohexylmethane.

40. The method according to one or more of embodiments 29 to 39, characterized in that in step (B) the at least one low molecular weight diol (CE) is selected from the group consisting of ethylene glycol, diethylene glycol, triethylene glycol, 1,3-propanediol, 1,4-butanediol, 1,5-pentanediol, 1,6-hexanediol, hydroquinone bis 2-hydroxyethyl ether and bis-2(hydroxy ethyl)-terephthalate.

41. The method according to one or more of embodiments 29 to 40, characterized in that in step (B) the at least one additive (AD) is selected from the group consisting of antioxidant, hydrolysis stabilizer, light stabilizer, UV absorbers, blowing agents and other process stabilizers.

42. The method according to one or more of embodiments 29 to 41, characterized in that in step (B) the molar ratio between the at least one polyol composition (P) and the at least one polyisocyanate (PI) is in the range of ≥0.1:1 to ≤1:1.

43. A thermoplastic polyurethane obtained or obtainable by the method according to one or more of embodiments 29 to 42.

44. A thermoplastic polyurethane obtained by the method according to one or more of embodiments 29 to 42, characterized in that the thermoplastic polyurethane has a $T_g$ in the range of ≥−60° C. to ≤10° C. determined by dynamic mechanical thermal analysis according to DIN EN ISO 6721-1:2011-08 at a heating rate of 2 K/min and 1 Hz torsion mode and a hard segment fraction in the range of ≥0.1 to ≤0.7, the hard segment fraction being defined by the formula:

$$\text{Hard segment fraction} = \left\{ \sum_{x=1}^{k} [(m_{KV,CE}/M_{KV,CE}) * M_{Iso} + m_{KV,CE}] \right\} / m_{total}$$

wherein,
$m_{KV,CE}$ is the mass of the at least one low molecular weight diol (CE) in g,
$M_{KV,CE}$ is the molar mass of the at least one low molecular weight diol (CE) in g/mol,
$M_{Iso}$ is the molar mass of the at least one polyisocyanate (PI) in g/mol,
$m_{total}$ is the total mass of all the starting materials in g,
k is the number of the at least one low molecular weight diol (CE).

45. Use of the thermoplastic polyurethane according to embodiment 43 or 44 or the thermoplastic polyurethane obtained by the method according to one or more of claims 1 to 13 in extruded article and injection molded article.

46. A method for producing expanded thermoplastic polyurethane particles, comprising:
(a) melting the thermoplastic polyurethane according to embodiment 43 or 44 or the thermoplastic polyurethane obtained by the method according to one or more of embodiments 29 to 42 to obtain a melt,
(b) mixing a blowing agent with the melt obtained in step (a), and
(c) producing expanded thermoplastic polyurethane particles from the resulting melt.

47. Expanded thermoplastic polyurethane particles obtained by the method according to embodiment 46.

48. A particle foam based on the expanded thermoplastic polyurethane particles according to embodiment 47.

49. Use of the expanded thermoplastic polyurethane particles according to embodiment 47 or the particle foam according to embodiment 48 for the production of filling material for mattresses, parts of mattresses, mattresses as such, filling of tires, tires or part of tires, shoes, shoe-soles, shoe-midsoles gymnastic mats, protective clothing, cushioning elements for automotive, sound absorbers, anti-vibration devices, cushioning elements for bicycle saddles, toys, flooring or packaging materials.

The invention is further illustrated by the following examples which do not limit the scope of the invention.

Examples and Comparative Examples

1. Compounds
Polyester Polyol

| Polyol | OH value (mg KOH/g) | Type of polyol |
|---|---|---|
| Polyol 1 | 56.4 | Polycaprolactone polyol with Polytetrahydrofuran having Mn of 1000 as the starter molecule, obtained from Perstorp |
| Polyol 2 | 113.3 | Polytetrahydrofuran having Mn of 1000 obtained from BASF |
| Polyol 3 | 81.2 | Polytetrahydrofuran having Mn of 1400 obtained from BASF |
| Polyol 4 | 62.2 | Polytetrahydrofuran having Mn of 1800 obtained from BASF |
| Polyol 5 | 55.9 | Polytetrahydrofuran having Mn of 2000 obtained from BASF |

Polyisocyanate-4,4'-MDI having an isocyanate content of 33.5 wt.-% obtained from BASF.

| Low molecular weight diol | |
|---|---|
| CE 1 | 1,6-Hexanediol |
| CE 2 | 1,4-Butanediol |
| | were obtained from Sigma Aldrich |
| Additive AD 1 | Phenolic antioxidant stabilizer obtained from BASF |

2. Standard Methods

| | |
|---|---|
| Number average molecular weight ($M_n$) | DIN 55672-1: 2016 March |
| OH value | DIN 53240-3: 2016 March |
| Density | DIN EN ISO 845: 2009 October |
| Shore hardness | ASTM D2240: 2015 |
| Tensile strength | DIN 53504: 2017 March |
| Elongation at break | DIN 53504: 2017 March |

| | |
|---|---|
| Tear strength | DIN ISO 34-1, B: 2016 September |
| Abrasion wear | DIN ISO 4649: 2014 March |
| $T_g$ by DMA | DIN EN ISO 6721-1: 2011 August |

All values given in the present application for the $T_g$ determined by dynamic mechanical thermal analysis according to DIN EN ISO 6721-1:2011-08 were determined at a heating rate of 2 K/min and 1 Hz torsion mode. Deviant from the DIN norm, the temperature was adjusted step wise by 5 K and 35 s per step which corresponds to a continuous heating rate of 2 K/min. The measurements were conducted with a sample with a ratio of width:thickness of 1:6.

3. General TPU Synthesis

In a 3.5 L metal container, polyol composition and low molecular weight diol were mixed with a mechanical stirrer and heated up to 80° C. In a separate vessel, polyisocyanate was heated to a temperature of 50° C. Once the temperature of the mixture reached 80° C., preheated polyisocyanate was added under constant stirring. Due to the exothermic reaction, the melt temperature increased rapidly. At a melt-temperature of 110° C., the mixture was poured into a teflon frame kept over a hot plate having a temperature of 125° C. for 10 minutes to obtain a TPU slab. Once the TPU slab turned solid, it was removed from the hot plate and subsequently annealed inside a hot oven at 80° C. for 15 h. The TPU was al-lowed to cool gradually, followed by milling in a miller and thereafter shredded to small granulates. The granulates were dried at 110° C. for 3 h and then injection molded to test plaques of size 2 mm×9 cm×12 cm. The test plaques were then used to determine the mechanical performance.

Table 1a and 1b hereinbelow summarize both inventive examples (IE) and comparative examples (CE) obtained using the general synthesis, as described hereinabove.

Table 2a and 2b hereinbelow summarize the properties of both the inventive examples (IE) and comparative examples (CE), as described in Table 1a and Table 1b respectively.

TABLE 1a

Comparative and inventive TPU composition.

| Components | TPU | | | | | |
|---|---|---|---|---|---|---|
| | Comp. Ex. 1 | Inv. Ex. 1 | Comp. Ex. 2 | Inv. Ex. 2 | Comp. Ex. 3 | Inv. Ex. 3 |
| Polyol 1 | — | 950 g | — | 676.02 g | — | 580.03 g |
| Polyol 2 | 850 g | — | — | — | — | — |
| Polyol 3 | — | — | — | — | — | — |
| Polyol 4 | — | — | — | — | — | — |
| Polyol 5 | — | — | 1000 g | 340.98 g | 870 g | 289.97 g |
| Polyisocyanate | 535.50 g | 436.33 g | 367.11 g | 374.27 g | 450.82 g | 451.70 g |
| CE 1 | — | — | — | — | 161.68 g | 161.79 g |
| CE 2 | 114.41 g | 114.48 g | 87.31 g | 88.85 g | — | — |
| AD 1 | 15.16 g | 15.16 g | — | — | 14.98 g | 14.98 g |

TABLE 1b

Inventive TPU composition.

| Components | TPU | | | | |
|---|---|---|---|---|---|
| | Inv. Ex. 4 | Inv. Ex. 5 | Inv. Ex. 6 | Inv. Ex. 7 | Inv. Ex. 8 |
| Polyol 1 | 870 g | 566.70 g | 566.70 g | 290.06 g | 664.72 g |
| Polyol 2 | — | — | — | — | — |
| Polyol 3 | — | 283.31 g | — | — | — |
| Polyol 4 | — | — | 283.31 g | — | — |
| Polyol 5 | — | — | — | 579.94 g | 335.28 g |
| Polyisocyanate | 452.13 g | 462.89 g | 446.69 g | 451.26 g | 413.75 g |
| CE 1 | 161.84 g | 160.71 g | 158.73 g | 161.73 g | 136.17 g |
| CE 2 | — | — | — | — | — |
| AD 1 | 14.98 g | 14.88 g | 14.70 g | 14.98 g | 15.66 g |

TABLE 2a

Mechanical properties for TPU composition of Table 1a.

| Property | TPU | | | | | |
|---|---|---|---|---|---|---|
| | Comp. Ex. 1 | Inv. Ex. 1 | Comp. Ex. 2 | Inv. Ex. 2 | Comp. Ex. 3 | Inv. Ex. 3 |
| Hard segment fraction | 0.29 | 0.29 | 0.23 | 0.23 | 0.34 | 0.34 |
| Density, kg/m$^3$ | 1120 | 1131 | 1075 | 1104 | 1093 | 1117 |
| Shore A hardness | 87 | 85 | 79 | 79 | 88 | 85 |
| Tensile strength, MPa | 54 | 43 | 30 | 39 | 51 | 49 |
| Elongation at break, (%) | 510 | 630 | 720 | 770 | 550 | 520 |
| Tear strength, (kN/m) | 65 | 65 | 52 | 49 | 48 | 57 |
| Abrasion wear, (mm$^3$) | 41 | 35 | 57 | 41 | 38 | 44 |
| $T_g$ at max tan delta | −25° C. | −40° C. | −55° C. & −15° C. | −45° C. | −55° C. & −10° C. | −40° C. |
| $T_g$ at max G" | −40° C. | −50° C. | −65° C. | −55° C. | −65° C. | −55° C. |

TABLE 2b

Mechanical properties for TPU composition of Table 1b.

| Components | TPU | | | | |
|---|---|---|---|---|---|
| | Inv. Ex. 4 | Inv. Ex. 5 | Inv. Ex. 6 | Inv. Ex. 7 | Inv. Ex. 8 |
| Hard segment fraction | 0.34 | 0.34 | 0.34 | 0.34 | 0.27 |
| Density, kg/m$^3$ | 1130 | 1120 | 1118 | 1106 | 1103 |
| Shore A hardness | 85 | 84 | 86 | 88 | 79 |
| Tensile strength, MPa | 42 | 42 | 41 | 43 | 38 |
| Elongation at break, (%) | 630 | 620 | 660 | 660 | 820 |
| Tear strength, (kN/m) | 70 | 73 | 67 | 64 | 51 |
| Abrasion wear, (mm$^3$) | 43 | 46 | 46 | 49 | 39 |
| $T_g$ at max tan delta | −35° C. | −30° C. | −35° C. | −40° C. | −40° C. |
| $T_g$ at max G" | −45° C. | −45° C. | −50° C. | −55° C. | −55° C. |

The examples of the present invention do not show soft phase crystallization in the resulting TPU. In order for the TPU to showcase soft phase crystallization, the tan delta values when plotted against temperature show dual peaks at different temperatures. The temperatures at which the tan delta shows a peak or is maximum, the corresponding value on the temperature scale is the $T_g$ value of the TPU. Accordingly, the soft phase crystallization can be observed in the comparative examples which show dual peaks of max tan delta values. On the contrary, the present invention TPU does not shows any such behaviour and has a single $T_g$ at max tan delta value.

As regards the comparative example 1, it is observed that the said example did not result in any soft phase crystallization. However, the resulting $T_g$ value is sufficiently high in comparison with the $T_g$ value of the inventive example 1. Moreover, the mechanical properties of the inventive example 1 are improved in comparison to the comparative example 1. The sufficiently low $T_g$ values of the present invention TPU along with the improved mechanical properties renders them suitable for a wide variety of applications, as described hereinabove.

4. Synthesis of E-TPU by Underwater Granulation

TPU extrudates may be obtained in a twin-screw extruder, such as but not limited to ZSK43 by Coperion GmbH. The polyol composition, polyisocyanate and low molecular weight diol in the presence of stabilizers are added in suitable amounts along with a catalyst, such as but not limited to tin(II) dioctoate, at a temperature in the range of 180° C. to 220° C. and reacted. Additionally, a further extruder may also be employed, such as but not limited to a ZSK92 twin-screw extruder from Coperion GmbH and the reaction can be further progressed at a temperature in the range of 200° C. to 240° C. Table 3 below provides possible amounts of the typical ingredients which may be used in the said extruder.

Pelletization of the extrusion product or polymer melt, as obtained hereinabove, may be done using suitable methods, such as but not limited to, by forcing the polymer melt through a temperature-regulated pelletizing die at 200° C. into a water-flooded pelletizing chamber and cut-off with subsequent isolation and drying of the resulting pellets at a temperature of 70° C. for 4 h.

TABLE 3

Possible amounts of ingredients for extrusion

| Components | TPU | | |
|---|---|---|---|
| | TPU 1 | TPU 2 | TPU 3 |
| Hard segment | 0.30 | 0.35 | 0.42 |
| Polyol 1 | 613.36 g | 573.36 g | 513.36 g |
| Polyol 5 | 306.64 g | 286.64 g | 256.64 g |
| Polyisocyanate | 416.77 g | 461.83 g | 522.79 g |
| CE 1 | 142.33 g | 167.16 g | 201.28 g |

For obtaining expanded beads or E-TPU, the TPUs obtained hereinabove are dried and mixed in an extruder, such as ZE75 twin-screw extruder by KraussMaffei Berstorff GmbH, followed by further addition of suitable additives, such as but not limited to talc as nucleating agent to obtain a mixture. Optionally, a TPU which has been separately obtained in an extrusion process by admixing the polyisocyanate, may also be added to the mixture. The mixture is melted at a temperature in the range of 160° C. to 220° C., while blowing agents such as but not limited to $CO_2$ and $N_2$ are, in the extruder, injected and mixed to form a homogeneous melt. The melt may be gear pumped at a temperature in the range of 160° C. to 200° C. into a pelletizing die and cut in an underwater pelletization (or UWP) cutting chamber into pellets.

The pellets are then carried off by a temperature regulated and pressurized water stream, expanding in the process in a controlled manner to obtain expanded pellets. Once the expanded pellets have been separated out of the water by suitable means, such as but not limited to a centrifugal dryer, they are dried at 60° C. for 2 h. Table 4 below summarizes the suitable process parameters for obtaining the expanded pellets.

TABLE 4

Suitable process parameters for obtaining expanded pellets

| E-TPU | TPU | E-TPU bead mass (mg) | Bulk density (kg/m3) | $CO_2$ (wt.-%) | $N_2$ (wt.-%) | Water pressure in UWP (bar) | Water temperature in UWP (° C.) |
|---|---|---|---|---|---|---|---|
| E-TPU 1 | TPU 1 | 25 | 130-150 | 1.3-1.5 | 0.19-0.23 | 12-15 | 30-40 |
| E-TPU 2 | TPU 1 | 32 | 110-130 | 1.3-1.5 | 0.19-0.23 | 12-15 | 30-40 |
| E-TPU 3 | TPU 2 | 25 | 130-160 | 1.3-1.5 | 0.19-0.23 | 12-15 | 35-45 |
| E-TPU 4 | TPU 3 | 25 | 130-160 | 1.3-1.5 | 0.19-0.23 | 12-15 | 35-45 |

LITERATURE CITED

U.S. Pat. No. 9,593,199 B2
U.S. Pat. No. 6,008,312 A
U.S. Pat. No. 9,422,393 B
U.S. Pat. No. 8,859,692 B2
U.S. Pat. No. 6,323,299 B1
U.S. Pat. No. 4,131,731
EP 0 090 444 A
US 2015/0038605 A1
WO2013/153190
WO2014/198779
WO2015/055811
WO2017/030835 US2017/0036377
US2016/0271847
US2016/0108198
WO2014/150119
WO2014/150124
WO2016/131671
Plastics Additive Handbook, 5th Edition, H. Zweifel, ed., Hanser Publishers, Munich, 2001 ([1]), p. 98 S136
DE 19821668 A1
U.S. Pat. No. 6,184,410
DE 10004328 A1
U.S. Pat. No. 6,184,410
DE 10004328 A1
U.S. Pat. No. 6,730,807
EP 0940389 B1
U.S. Pat. No. 5,498,747
WO2005/023920
WO2007/082838
WO2010/136398

The invention claimed is:

1. A method for preparing a thermoplastic polyurethane, the method comprising:
(A) providing at least one polyol composition (P) comprising
a poly-ε-caprolactone polyol (P1), and
a polyol (P2) which is different from the poly-ε-caprolactone polyol (P1);
(B) reacting the at least one polyol composition (P) of (A) with at least one polyisocyanate (PI) and at least one low molecular weight diol (CE) optionally in the presence of at least one catalyst (CA) and/or at least one additive (AD) to obtain a thermoplastic polyurethane,
wherein the at least one polyol composition (P) has a number average molecular weight Mn in a range of ≥1,500 g/mol to ≤10,000 g/mol determined according to DIN 55672-1: 2016-03,
wherein the at least one low molecular weight diol (CE) has a molecular weight in a range of ≥50 g/mol to ≤350 g/mol, and
wherein in (A) the poly-ε-caprolactone polyol (P1) is obtained by reacting
ε-caprolactone (P11), and
a starter molecule (P12) having a number average molecular weight in a range of ≥80 g/mol to ≤1500 g/mol determined according to DIN 55672-1: 2016-03,
wherein the starter molecule (P12) is selected from the group consisting of neopentyl glycol, 1,4-butanediol, 1,6-hexanediol, polyethylene glycol, polypropylene glycol, α-hydro-ω-hydroxypoly(oxytetra-methylene) diol and α-hydro-ω-hydroxypoly(oxytri-methylene) diol, and
wherein in (B) a molar ratio between the at least one polyol composition (P) and the at least one polyisocyanate (PI) is in a range of ≥0.1:1 to ≤0.85:1.

2. The method of claim 1, wherein the thermoplastic polyurethane obtained has a $T_g$ in a range of ≥−60° C. to ≤10° C. determined by dynamic mechanical thermal analysis according to DIN EN ISO 6721-1:2011-08 at a heating rate of 2 K/min and 1 Hz torsion mode.

3. The method of claim 1, wherein a weight ratio between the poly-ε-caprolactone polyol (P1) and the polyol (P2) in the at least one polyol composition (P) is in a range of ≥1:5 to ≤10:1.

4. The method of claim 1, wherein the poly-ε-caprolactone polyol (P1) has a number average molecular weight in a range of ≥1500 g/mol to ≤2500 g/mol determined according to DIN 55672-1: 2016-03.

5. The method of claim 1, wherein the polyol (P2) has a number average molecular weight Mn in a range of ≥1000 g/mol to ≤4000 g/mol determined according to DIN 55672-1: 2016-03.

6. The method of claim 1, wherein the poly-ε-caprolactone polyol (P1) in (A) has a weight ratio between the ε-caprolactone (P11) and a starting molecule (P12) in a range of ≥1:10 to ≤10:1.

7. The method of claim 1, wherein the polyol (P2) is selected from the group consisting of a polyether polyol, polyester polyol and polycarbonate polyol.

8. The method of claim 1, wherein in (B) the at least one polyisocyanate (PI) is selected from the group consisting of 2,2'-, 2,4'- and 4,4'-diphenylmethane diisocyanate, 2,4- and 2,6-toluene diisocyanate, 1,2-, 1,3- and 1,4-cyclohexane diisocyanates, hexamethylene 1,6-diisocyanate, 2-methyl-1,5-pentamethylene diisocyanate, pentamethylene 1,5-diisocyanate, tetramethylene 1,4-diisocyanate, isophorone diisocyanate, p-phenyl diisocyanate, o-tolidine diisocyanate and 1,5-naphthalene diisocyanate and 4,4'-diisocyanatdicyclohexylmethane.

9. The method of claim 1, wherein in (B) the at least one low molecular weight diol (CE) is selected from the group consisting of ethylene glycol, diethylene glycol, triethylene glycol, 1,3-propanediol, 1,4-butanediol, 1,5-pentanediol, 1,6-hexanediol, hydroquinone bis 2-hydroxyethyl ether and bis-2(hydroxy ethyl)-terephthalate.

10. The method of claim 1, wherein in (B) the at least one additive (AD) is selected from the group consisting of an antioxidant, a hydrolysis stabilizer, a light stabilizer, a UV absorber, a blowing agent and other process stabilizers.

11. A method of producing an extruded or injection molded article, the method comprising obtaining a thermoplastic polyurethane by the method of claim 1.

12. The method of claim 1, wherein in (B), the molar ratio between the at least one polyol composition (P) and the at least one polyisocyanate (PI) is in a range of $\geq 0.1:1$ to $\leq 0.7:1$.

* * * * *